United States Patent
Ho Kang et al.

(10) Patent No.: US 11,449,785 B2
(45) Date of Patent: Sep. 20, 2022

(54) METHOD AND SYSTEM FOR ARTIFICIAL INTELLIGENCE LEARNING USING MESSAGING SERVICE AND METHOD AND SYSTEM FOR RELAYING ANSWER USING ARTIFICIAL INTELLIGENCE

(71) Applicant: LINE Corporation, Tokyo (JP)

(72) Inventors: Seok Ho Kang, Seongnam-si (KR); Jae Gwang Lee, Seongnam-si (KR); Jea Seung Jung, Seongnam-si (KR); Hee-Cheol Seo, Seongnam-si (KR); JoongJae Lee, Seongnam-si (KR); Jeehyun Lee, Seongnam-si (KR); Young-sik Lim, Seongnam-si (KR); Injae Lee, Seongnam-si (KR)

(73) Assignee: LINE Corporation, Tokyo (JP)

( * ) Notice: Subject to any disclaimer, the term of this patent is extended or adjusted under 35 U.S.C. 154(b) by 1180 days.

(21) Appl. No.: 15/434,558

(22) Filed: Feb. 16, 2017

(65) Prior Publication Data

US 2017/0243136 A1 Aug. 24, 2017

(30) Foreign Application Priority Data

Feb. 24, 2016 (KR) .................. 10-2016-0021895
Apr. 6, 2016 (KR) .................. 10-2016-0042494

(51) Int. Cl.
*G06N 20/00* (2019.01)
*G06N 3/06* (2006.01)
(Continued)

(52) U.S. Cl.
CPC ............ *G06N 20/00* (2019.01); *G06N 3/006* (2013.01); *H04L 51/046* (2013.01); *H04L 51/216* (2022.05); *H04L 67/306* (2013.01)

(58) Field of Classification Search
CPC .............................. G06N 20/00; G06N 3/006
See application file for complete search history.

(56) References Cited

U.S. PATENT DOCUMENTS

| 8,468,143 B1 * | 6/2013 | Oztekin | ............ G06F 16/90335 |
| | | | 707/706 |
| 9,063,975 B2 * | 6/2015 | Isensee | ................. G06F 16/248 |
| (Continued) | | | |

FOREIGN PATENT DOCUMENTS

| JP | 2012-212438 A | 11/2012 |
| KR | 2007/0102267 A | 10/2007 |
| (Continued) | | |

OTHER PUBLICATIONS

Goh et al, Domain knowledge query bots in instant messaging (IM) (Year: 2008).*

(Continued)

*Primary Examiner* — Ann J Lo
*Assistant Examiner* — Van C Mang
(74) *Attorney, Agent, or Firm* — Harness, Dickey & Pierce, P.L.C.

(57) ABSTRACT

Provided are an artificial intelligence (AI) learning method and system and an answer relay method and system using an AI. According to an AI learning method, an AI may transmit a question to users through a messaging service and may acquire learning data for the AI through reactions of the user to the transmitted question.

18 Claims, 23 Drawing Sheets

(51) Int. Cl.
  *H04L 51/21* (2022.01)
  *H04L 51/04* (2022.01)
  *H04L 67/30* (2022.01)
  *G06N 3/00* (2006.01)
  *H04L 51/216* (2022.01)
  *H04L 51/046* (2022.01)
  *H04L 67/306* (2022.01)

(56) References Cited

U.S. PATENT DOCUMENTS

| | | | |
|---|---|---|---|
| 10,387,793 B2* | 8/2019 | Allen | G16H 10/60 |
| 2005/0216377 A1* | 9/2005 | Trauberg | G06Q 30/06 705/30 |
| 2013/0173725 A1 | 7/2013 | Ventilla et al. | |
| 2013/0260893 A1 | 10/2013 | Shin et al. | |
| 2013/0332543 A1 | 12/2013 | Shin et al. | |
| 2014/0019540 A1 | 1/2014 | Shin et al. | |
| 2016/0292582 A1* | 10/2016 | Kozloski | G06Q 50/01 |

FOREIGN PATENT DOCUMENTS

| | | |
|---|---|---|
| KR | 2009/0009386 A | 1/2009 |
| KR | 2012/0120316 A | 11/2012 |
| KR | 2016/0010190 A | 1/2016 |
| WO | WO-2015/065001 A1 | 5/2015 |

OTHER PUBLICATIONS

Agichtein et al, Finding High-Quality Content in Social Media (Year: 2008).*

Liu et al, Finding Experts in Community-Based Question-Answering Services (Year: 2005).*

Agichtein et al, "Finding High-Quality Content in Social Media", 2008 (Year: 2008).*

Goh, "Domain knowledge query conversation bots in instant messaging (IM)", 2008 (Year: 2008).*

Japanese Office Action dated Dec. 1, 2020 issued in corresponding Japanese Patent Application No. 2017-030552.

* cited by examiner

FIG. 19

METHOD AND SYSTEM FOR ARTIFICIAL INTELLIGENCE LEARNING USING MESSAGING SERVICE AND METHOD AND SYSTEM FOR RELAYING ANSWER USING ARTIFICIAL INTELLIGENCE

CROSS-REFERENCE TO RELATED APPLICATION(S)

This application claims priority under 35 U.S.C. § 119 to Korean Patent Application No. 10-2016-0021895 file on Feb. 24, 2016 and Korean Patent Application No. 10-2016-0042494 filed on Apr. 6, 2016, in the Korean Intellectual Property Office (KIPO), the entire contents of which are incorporated herein by reference.

BACKGROUND

Field

One or more example embodiments relate to artificial intelligence (AI) learning methods and/or systems using a messaging service, and/or answer relay methods and/or systems using an AI.

Description of Related Art

In the related arts, technology for responding to a query of a user in a web environment or a mobile environment is disclosed. For example, a search engine refers to software that enables a user to retrieve desired information from a large amount of materials scattered over the Internet. The search engine provides the user with a document or a website corresponding to a query (e.g., a keyword or a search condition of the user) as an answer. Such search engine-based searches pose a problem of returning variously tangentially related information in the result, and thus a user having placed the query generally spends extra time to sort out the results of the search or review each item in the results.

As other examples, an answer corresponding to a query of a user may be searched or provided using a method based on a social information messenger of platform users in a mobile environment. See PCT Application PCT/KR/2014/010167, US Patent Applicant Publications US2014/0019540A1, US2013/0332543A1, or US2013/0260893. According to these examples, the method retrieves an answer corresponding to the query of the user from a pre-configured database and provides the retrieved answer. Such methods pose a problem of receiving answers from other users related in the social media, regardless of whether the other users are competent to answer the question

SUMMARY

One or more example embodiments provide an artificial intelligence (AI) learning methods and/or systems that may transmit question data to users using a messaging service in an instant messaging environment and may train an AI using answers of the users.

One or more example embodiments also provide answer relay methods and/or systems that enable an AI to directly provide an answer to a question using an instant message of a user in an instant messaging environment and to relay an answer using an instant message of each of other users or a user selected as a specialist (e.g., an expert) in a specific field from among the other users, thereby connecting the users to each other.

According to an example embodiment, there is provided an AI learning method of an AI learning system configured as a computer, the method comprising selecting question data; verifying a communication session between an account of at least one user among users registered to a messaging service and an AI account registered to the messaging service, transmitting the question data to the at least one user through the verified communication session as an instant message of the AI account, receiving answer data to the question data from the at least one user through the verified communication session, and generating learning data to train the AI learning system based on the question data and the received answer data.

According to an example embodiment, an AI learning system includes a memory configured to store non-transitory computer-readable instructions, and at least one processor configured to execute the non-transitory computer-readable instructions such that the at least one processor is configured to select question data, verify a communication session between an account of at least one user among users registered to a messaging service and an AI account registered to the messaging service, transmit the question data to the at least one user through the verified communication session as an instant message of the AI account, receive answer data to the question data from the at least one user through the verified communication session, and generate learning data for an AI based on the question data and the received answer data.

According to an example embodiment, an answer relay method of an answer relay system includes receiving question data of a first user through a first communication session between an account of the first user among users registered to a messaging service and an AI account registered to the messaging service, selecting a second user to which the question data of the first user is to be transmitted from among the users registered to the messaging service, and transmitting the question data to the second user through a second communication session between an account of the second user and the AI account, receiving answer data to the question data from the second user through the second communication session, and transmitting the received answer data to the first user as an answer through the first communication session.

According to some example embodiments, transmitting question data to users using a messaging service in an instant messaging environment and training an AI using answers of the users to the question data may be possible.

Also, according to some example embodiments, an AI may directly provide an answer to a question using an instant message of a user in an instant messaging environment, and may also relay an answer using an instant message of each of other users or a user selected as a specialist (an expert) of a specific field from among the other users, thereby connecting the users to each other.

Further, according to some example embodiments, the aforementioned problems of conventional art can be mitigated or prevented from occurring, and more relevant results can be obtained by taking advantage of AI. By utilizing AI, a system or a method may be configured, for example, to not receive an answer from a user who is not reliable to answer a question can be negated regardless of the user's relationship on a social media (e.g., messenger service) with a user asking the question, or may be configured, for example, to receive an answer from a specialist who is determined to have a capability of providing a reliable answer based on a profile of a user on the social media (e.g., messenger service).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the accompanying figures, wherein like reference numerals refer to like parts throughout the various figures unless otherwise specified, and wherein:

FIG. 19 illustrates an example of verifying an answerable field of an answerer according to at least one example embodiment;

Figure 1:
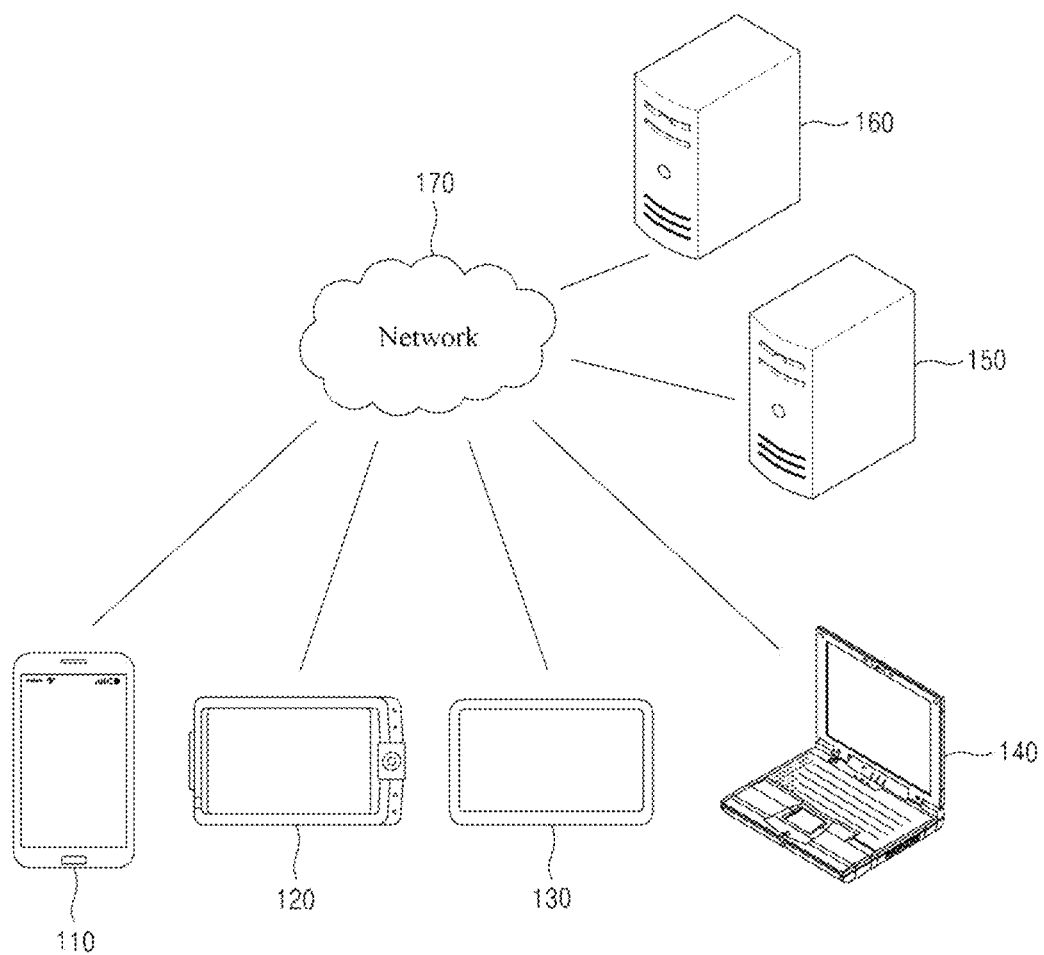
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference numerals/characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transmit and/or distribute the computer programs, program code, instructions, or some combination thereof, over a network. The remote computing system may transmit and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and generate data in response to execution of the software. For simplicity, one or more example embodiments may be implemented as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to some example embodiments and the accompanying drawings, modifications, additions and substitutions of example embodiments may be variously made according to the description by those of ordinary skill in the art. For example, the described operations may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example. Thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), tablet personal computer (PC), and the like. For example, the electronic device 110 may be configured to communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network (e.g., a mobile communication network, wired Internet, wireless Internet, or a broadcasting network), which may be included in the network 170. For example, the network 170 may include at least one of various network topologies that include a personal area network (PAN), a local area network (LAN), a campus area network (CAN), a metropolitan area network (MAN), a wide area network (WAN), a broadband network (BBN), or the Internet. The network 170 may include at least one of network topologies that include a bus network, a star network, a ring network, a mesh network, a star-bus network, or a tree or hierarchical network. However, example embodiments are not limited thereto.

Each of the servers 150 and 160 may be configured as a computer apparatus or a plurality of computer apparatuses that provide, for example, instructions, codes, files, contents, and/or services through communication with the plurality of electronic devices 110, 120, 130, and/or 140 over the network 170. For example, the electronic device 110 may be configured to be connected to the server 150 through the application installed on the electronic device 110, and may be configured to use a desired (or alternatively, preset) service (e.g., a game service, a chat service, a social media, or a financial service).

For example, the server 150 may provide an artificial intelligence (AI) function for an answer relay method according to some example embodiments, and may provide an answer in response to a query provided from the electronic device 110.

Figure 2:
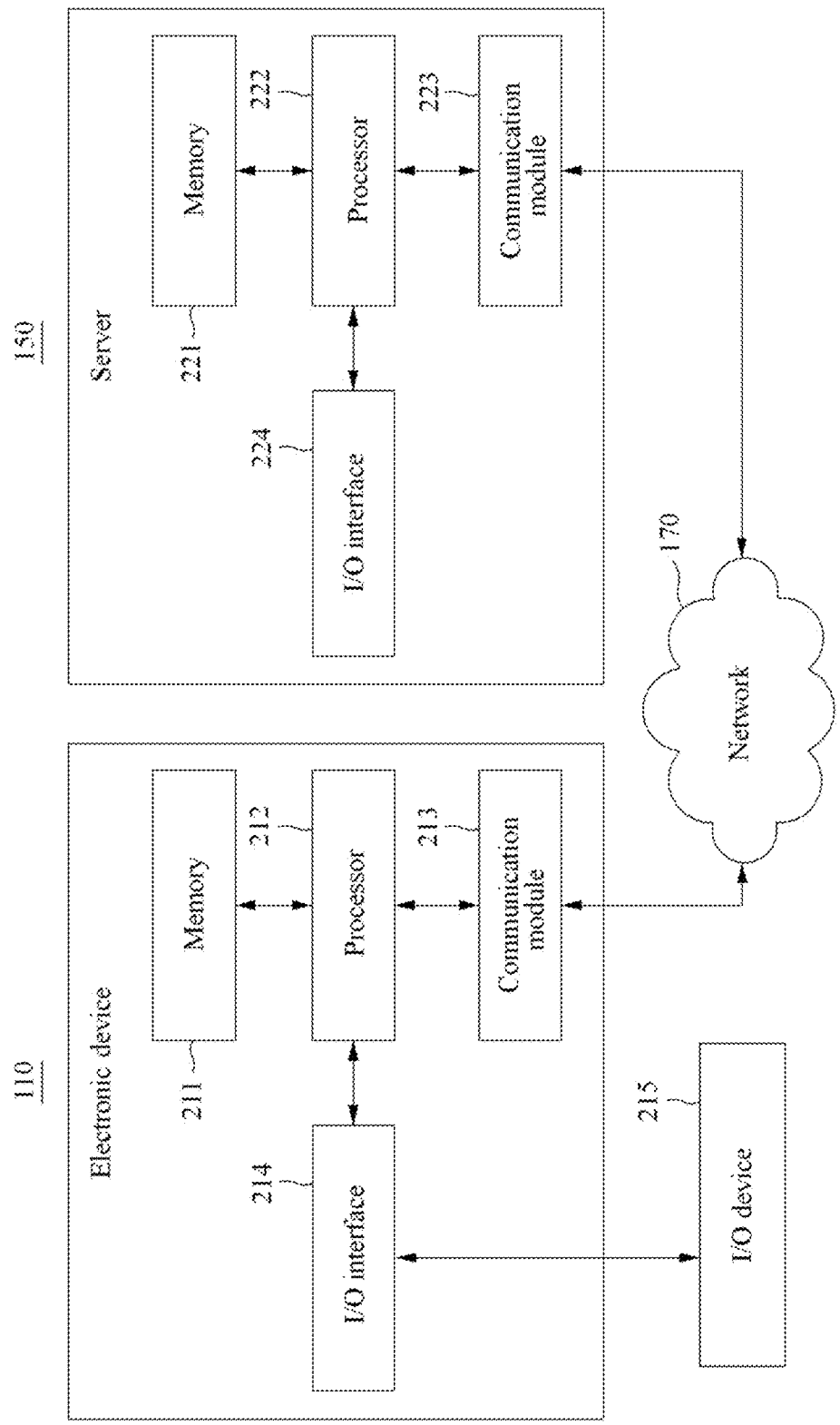
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Here, a ROM and/or a permanent mass storage device may be provided as a permanent storage device, which is separate from the memory 211, 222. An OS and at least one program code (e.g., a code for an application for a desired (or alternatively, predetermined) service, or a code for a browser), may be stored in the memory 211, 221 of the electronic device 110 for installation and execution by the electronic device 110. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, or a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program (e.g., an application) by installing files provided over the network 170 from developers or a file distribution system (e.g., the server 160, which provides an installation file of the application).

The processor 212, 222 may be configured to process computer-readable instructions, for example, the aforementioned at least one program code of a computer program by performing basic arithmetic operations, logic operations, and/or I/O operations. The computer-readable instructions may be provided from the memory 211, 221 and/or the communication module 213, 223 to the processor 212, 222. For example, the processor 212, 222 may be configured to execute the received instructions in response to the program code stored in the storage device (e.g., the memory 211, 221).

The communication module 213, 223 may provide a function for communication between the electronic device 110 and the server 150 over the network 170, and/or may provide a function for communication with another electronic device (e.g., the electronic device 120 or another server, for example, the server 160). For example, the processor 212 of the electronic device 110 may transmit a request (e.g., a request for a video call service) that is generated based on a program code stored in the storage device (e.g., the memory 211) to the server 150 over the network 170 under control of the communication module 213. A control signal, an instruction, content, a file, etc. may be provided under control of the processor 222 of the server 150, and may be received at the electronic device 110 through the communication module 213 of the electronic device 110 by going through the communication module 223 and the network 170. For example, the control signal and the instruction of the server 150 received through the communication module 213 may be transmitted to the processor 212 or the memory 211, and the content and the file may be stored in a storage medium, which is further included in the electronic device 110.

The I/O interface 214, 224 may be a circuit or a device used for interface with an I/O device 215. For example, an input device may include, for example, a keyboard, or a mouse and an output device may include, for example, a display for displaying a communication session of an application. The I/O interface 214 may be a circuit or a device that is configured to interface with an apparatus (e.g., a touch screen), in which an input function and an output function are integrated into a single function. For example, when processing instructions of the computer program loaded to the memory 211, the processor 212 of the electronic device 110 may display a service screen that is configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to further illustrate such additional constituent elements because those elements are known in the related art. For example, the electronic device 110 may include at least a portion of the I/O device 215, or may further include other constituent elements (e.g., a transceiver, a global positioning system (GPS) module, a camera, a variety of sensors, and/or a database). For example, if the electronic device 110 is a smartphone, the electronic device 110 may be configured to further include a variety of constituent elements (e.g., an accelerometer sensor, a gyro sensor, a camera, various physical buttons, a button using a touch panel, an I/O port, and/or a vibrator for causing vibration).

Figure 3:
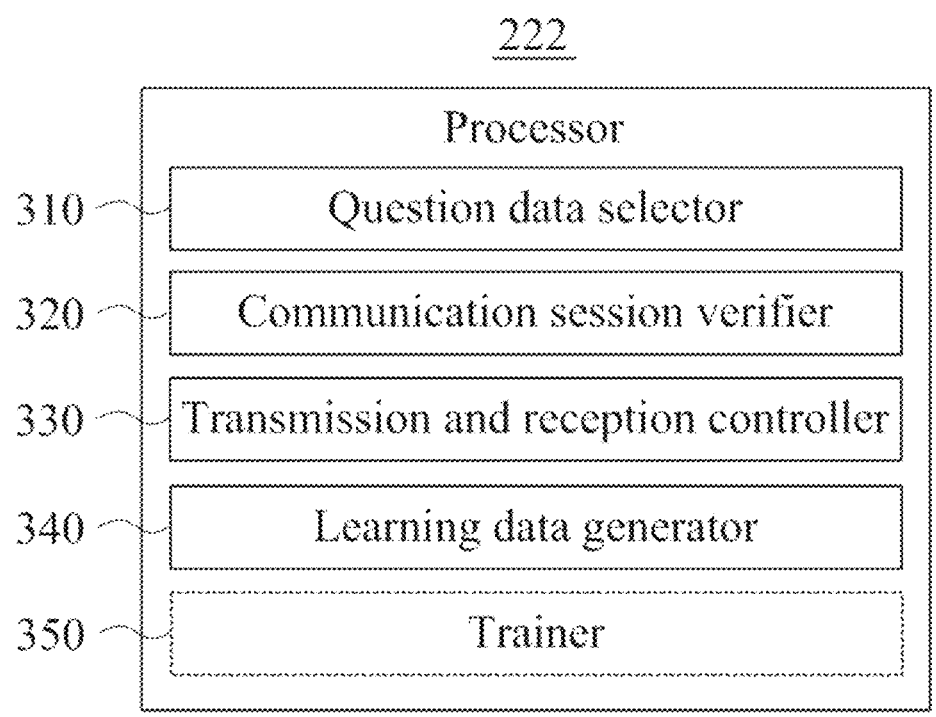
FIG. 3 is a diagram illustrating an example of constituent elements of a processor of a server according to at least one example embodiment.
Figure 4:
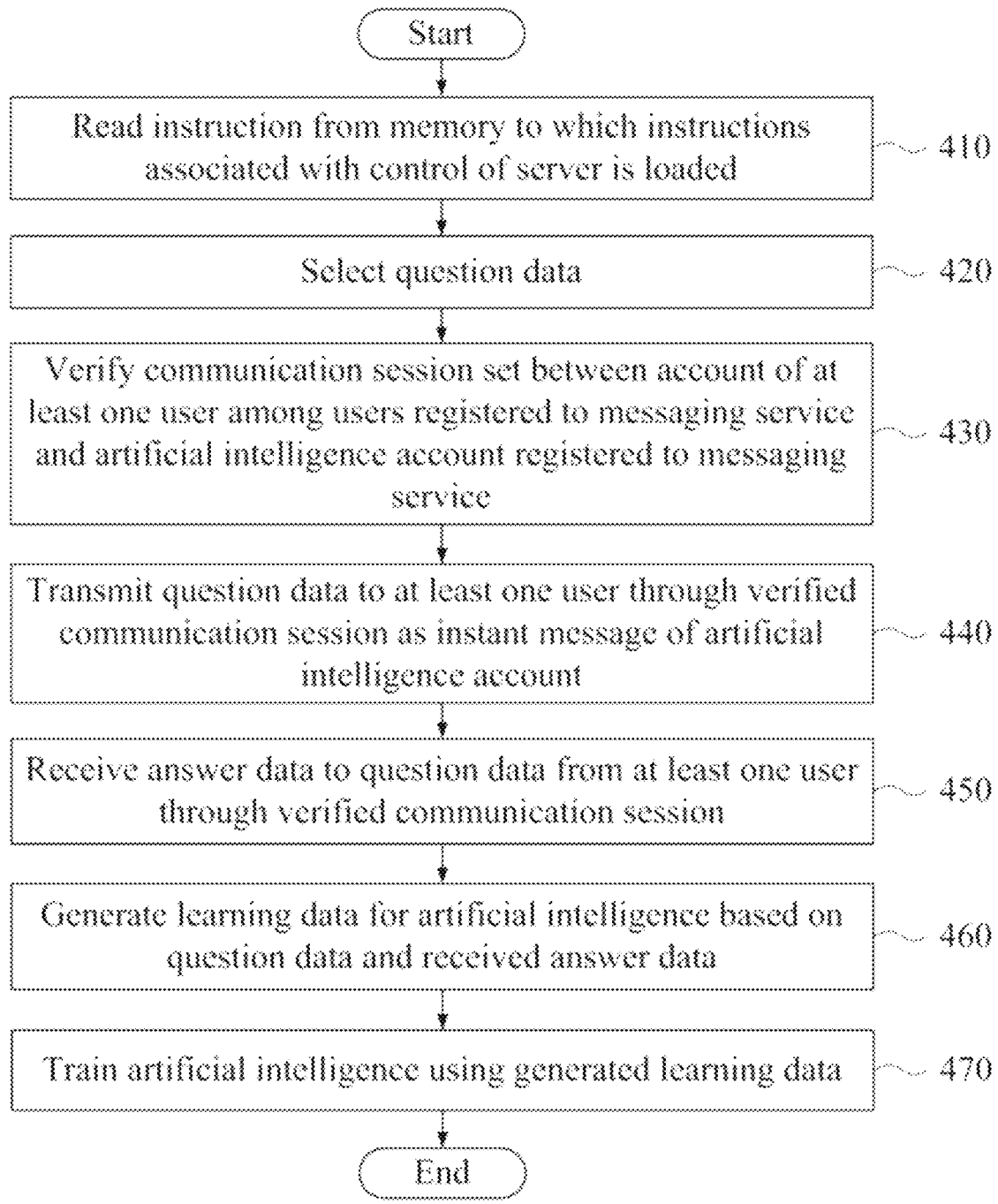
FIG. 4 is a flowchart illustrating an example of a AI learning method performed at a server according to at least one example embodiment.

FIG. 3 is a diagram illustrating an example of constituent elements of a processor of a server according to at least one example embodiment. FIG. 4 is a flowchart illustrating an example of a method performed at a server according to at least one example embodiment.

According to some example embodiments, an AI learning system configured as a computer may be constructed in the server 150. Referring to FIG. 3, to perform an AI learning method of FIG. 4, the processor 222 of the server 150 may include a question data selector 310, a communication session verifier 320, a transmission and reception controller 330, and a learning data generator 340 as constituent elements. Optionally, the processor 222 may further include a trainer 350.

The processor 222 and the constituent elements of the processor 222 may control the server 150 to perform operations 410 through 470 included in the AI learning method of FIG. 4. For example, the processor 222 and the constituent elements of the processor 222 may be configured to execute instructions according to a code of at least one program and/or a code of an OS stored in the memory 221.

Here, the constituent elements of the processor 222 may be representations of different functions performed at the processor 222 in response to a control instruction provided from the program code stored in the server 150. For example, the processor 222 may use the question data selector 310 as a functional representation that operates to control the server 150 to select question data in response to the instruction.

In operation 410, the processor 222 may read an instruction from the memory 221 to which an instruction associated with control of the server 150 is loaded. In this case, the instruction read from the memory 221 may include an instruction for controlling the processor 222 to perform operations 420 through 470.

In operation 420, the question data selector 320 may select question data. For example, in response to the instruction read in operation 410, the question data selector 320 may control the server 150 to select the question data. The question data may be selected from data received from an outside (e.g., a database connected to the server 150 or the electronic device 110 connected to the server 150 over the network 170), or data of a database included in the server 150. A method of selecting question data will be further described below.

In operation 430, the communication session verifier 320 may verify a communication session set between an account of at least one user among users registered to a messaging service and an AI account registered to the messaging service. In some example embodiments, through the messaging service, a messenger chatroom may be generated for a chat between users or a chat between a messenger chatroom between a user and an AI. Thus, a conversation (e.g., an instant message) may be transmitted and received through the generated messenger chatroom. The instant message may include various types of data (e.g., a text, an image, a hypertext link, and/or a video). In some example embodiments, the messenger chatroom may be identified using a communication session set between accounts of participants. That is, the communication session verifier 320 may verify at least one of messenger chatrooms open or communication sessions set between an account of a specific user or each of specific users and the AI account.

In operation 440, the transmission and reception controller 330 may transmit the question data to the at least one user through the verified communication session as an instant message of the AI account. For example, the transmission and reception controller 330 may control the server 150 to transmit question data "Is movie A interesting?" to an electronic device (e.g., the electronic device 110) of a first user by transmitting the question data "Is movie A interesting?" through a messenger chatroom, which is set with the first user. Here, a messenger application for a messaging service may be installed on the electronic device 110. A screen of the messenger chatroom may be generated and displayed on the electronic device 110 under control of the messenger application. The question data may be provided to the first user in such a manner that the electronic device 110 displays the question data "Is movie A interesting?" received from the server 150 through the generated messenger chatroom. If the first user inputs a specific answer using an input interface provided from the electronic device 110 under control of the messenger application, the input answer may be transmitted to the server 150 through the set communication session.

In operation 450, the transmission and reception controller 330 may receive answer data to the question data from the at least one user through the verified communication session. As described above, the server 150 may receive an answer transmitted from a user who have received question data through a communication session, as answer data to the question data. The question data may be transmitted to a plurality of users. In this case, the server 150 may receive a plurality of pieces of answer data to a single piece of question data. A user (hereinafter, an answerer) that transmits answer data may input an answer irrelevant to the question data. However, the server 150 may assume a input answer as preliminary answer data to any type of question data, and analyze and filter the preliminary answer data including a plurality of pieces to acquire appropriate pieces of the answer data.

In operation 460, the learning data generator 340 may generate learning data to train an AI based on the question data and the received answer data. For example, question data and at least one answer data corresponding thereto may be associated with each other, and may be stored as a single piece of learning data. In a single piece of learning data, a plurality of pieces of answer data may be associated with a single piece of question data. In some example embodiments, a single piece of learning data may be data in which a plurality of pieces of question data and a plurality of pieces of answer data corresponding to thereto are associated with each other. For example, a plurality of pieces of question data included in a single piece of learning data may include various different representations of the single piece of question data as well as the single piece of question data. The generated learning data may be used to train the AI.

In operation 470, a trainer 350 may train the AI using the generated learning data. For example, the learning data may be generated by mutually associating and thereby storing the question data and the received answer data. A learning database that is configured to store the learning data may be constructed in the server 150 or another apparatus that communicates with the server 150 over the network 170. The AI may be trained by acquiring further accurate answer data to question data from the learning database through a process of continuously filtering answer data suitable for the question data. A plurality of pieces of learning data may be categorized based on question data, and similar pieces of question data may be merged. Through this process, the AI may flexibly cope with various representations of a single question. Various known methods that are capable of training the AI using given data may be used to train the AI using the generated learning data.

For example, the server 150 may be a messaging server that provides the messaging service and the AI learning system may be configured to be included in the messaging server. The messaging server may be provided to users having registered to the messaging service, and may include a function of routing an instant message based on a set communication session. The AI learning system may be configured in the messaging server and may generate learning data based on question data and answer data using the function. As another example, the AI learning system may be configured as the server 150, and the messaging server may be configured as another server (e.g., the server 160), which is configured to communicate with the server 150 over the network 170. A communication session between the AI account and an account of a specific user may be set at the messaging server by transmitting a request for the communication session from the server 150, to the connected messaging server.

According to some example embodiments, in operation 430, the communication session verifier 320 may verify at least one of communication sessions set between the AI account and accounts of the users through the messaging server, or may verify the at least one user, and may set a new communication session between the account of the at least one user and the AI account through the messaging server. That is, if the communication session is set between the account of the selected user and the AI account, the communication session verifier 320 may verify the set communication session. If the communication session is not set, the communication session verifier 320 may set a new communication session between the account of the selected user and the AI account and may verify the newly set communication session.

According to some example embodiments, question data may be selected or generated using a database included in the AI learning system or connected to the AI learning system over the network 170. That is, a database for question data may be constructed in, for example, a permanent storage device included in the server 150. In some example embodiments, a database for question data may be constructed in a separate device connected to the server 150 and communicating with the server 150 over the network 170. The server 150 may select question data from the database. The database may be generated based on (i) at least one of instant messages transmitted and received between the users registered to the messaging service, (ii) instant messages transmitted and received between the registered users and the AI, and/or (iii) previously generated learning data. For example, at least one of conversations exchanged between users through the messaging service, conversations exchanged between the AI and the users, and/or learning data previously generated according to the AI learning method of FIG. 4 may be used to generate a plurality of pieces of question data.

According to some example embodiments, question data may be generated by users registered to the messaging service. For example, in operation 420, the question data selector 310 may generate the question data using an instant message received through a communication session set between an account of a first user among the users registered to the messaging service and the AI account. Here, the first user (hereinafter, a questioner) may be a user different from an answerer (a second user among the users registered to the messaging service that is selected to transmit answer data to the question data). For example, a question uploaded by the questioner through a messenger chatroom set between the questioner and the AI may be generated as question data and selected in operation 420. In this case, the question data of the questioner may be transmitted to the answerer in operation 440. Answer data to the question data may be received from the answerer in operation 450, and learning data may be generated in operation 460.

In this case, the answer data received in operation 450 may be transmitted through the communication session set for the account of the first user (e.g., the questioner). While generating the learning data, the answer to the question of the questioner may be provided to the questioner. Once the AI is trained to a certain level, the AI may directly provide an answer to the question of the questioner, and may discover an answerer who is capable of providing a reliable answer with respect to a question that the AI cannot directly answer. Such an answer relay method will be further described below.

In some example embodiments, in response to response data received from the first user (e.g., the questioner) in association with the answer data, the learning data generator 340 may generate learning data by further using the response data. For example, if the questioner does not like an answer to a question, the questioner may input a negative response. If the questioner likes the answer, the questioner may input a positive response. Accordingly, the server 150 may receive the questioner's response data with respect to the answer data, and use the received response data to generate learning data. If response data includes a negative response, answer data to question data may be learned as an inappropriate answer. If the response data includes a positive answer, the answer data to the question data may be learned as a relatively appropriate answer.

The answerer may be selected based on previous histories of users registered to the messaging service. The previous history may include at least one of a location of each of the users registered to the messaging service, a time at which the question data is transmitted through the messaging service, a time at which answer data to the question data is transmitted through the messaging service, and/or a time at which an answer to the question data is refused. For example, the location of the user may include a current location verified through a terminal of the user or a local code desired (or alternatively, preset) for the user. The time at which the question data is transmitted may be used to identify a user who has not posted a question (e.g., the question data) within a desired (or alternatively, predetermined) period of time or a user who have posted a question within the desired (or alternatively, predetermined) period of time. The time at which answer data to the question data is transmitted may be used to identify a user who have not transmitted an answer within a desired (or alternatively, predetermined) period of time after receiving the question data. The time at which the answer is refused may be used to identify a user who have spent the desired (or alternatively, predetermined) period of time after refusing to give an answer.

According to some example embodiments, an answerer candidate may be extracted as follows.

1) For example, five users may be randomly extracted as answerer candidates from the following users:

1-1) a user who has the same local code as a local code of a questioner;

1-2) a user who has spent 24 hours after last refusing to answer a question or having posted even a single question within recent 24 hours (a user who is capable of receiving an answer request (e.g., question data) after processing the answer refusal and restarts an electronic device or application of the user));

1-3) a user who has not transmitted an answer within the recent five minutes (to prevent a plurality of answer data from being received from a plurality of users at the same time); and 1-4) a user who has not posted a question within the recent ten minutes (to prevent another question from being received by a user (e.g., the questioner) who have posted a question and is waiting for an answer to the posted question).

2) If the user gives a question within next 5 minutes after receiving an answer, a last answerer to a previous question may be included in newly selected answerers.

3) If no answer is received from the above extracted users for 30 seconds, the AI may be called on and may directly provide an answer. At least a certain period of minimum time to receive an answer should be provided.

The above answerer candidate extraction method is provided as an example only, and the aforementioned times may be appropriately adjusted if desired. An answerer candidate may be extracted using a variety of methods. The term "answerer candidate" may be used to distinguish an answer, who has not transmitted an answer after receiving question data, from other answerers who have substantially transmitted answer data after receiving the question data.

According to another example embodiments, the answerer candidate extraction method may include selecting five users from among users having transmitted a question and/or an answer within a recent desired (or alternatively, predetermined) period of time, or viewing existing answer histories and selecting a user having transmitted an answer within, for example, a corresponding time zone.

For example, a desired (or alternatively, predetermined) number of users may be randomly selected from among the entire users (e.g., users registered to the messaging service). A user suitable for question data may be discovered based on the question data, and may be selected as an answerer candidate.

According to some example embodiments, separate answerer candidates may be registered in advance, and a user to which question data is to be transmitted may be selected based on profiles of the registered answerer candidates. For example, the processor 222 of the server 150 may further include a user manager (not shown). The user manager may manage a user registered as an answerer (e.g., an answerer candidate) among the users registered to the messaging service. In this case, a user to which question data is to be transmitted may be selected based on profiles of users registered as the answerer candidates. A profile may be generated based on an instant message transmitted and received through a communication session set between an account of a user registered as an answerer candidate and the AI account. For example, the AI may transmit various questions to the answerer candidate, and generate a profile of the answerer candidate based on answers to the transmitted questions. As another example, the AI may proceed with a given game (e.g., a game that is configured to select a subjective answer), and generate a profile of the answerer candidate based on a game result. A profile generation process will be further described.

Figure 5:
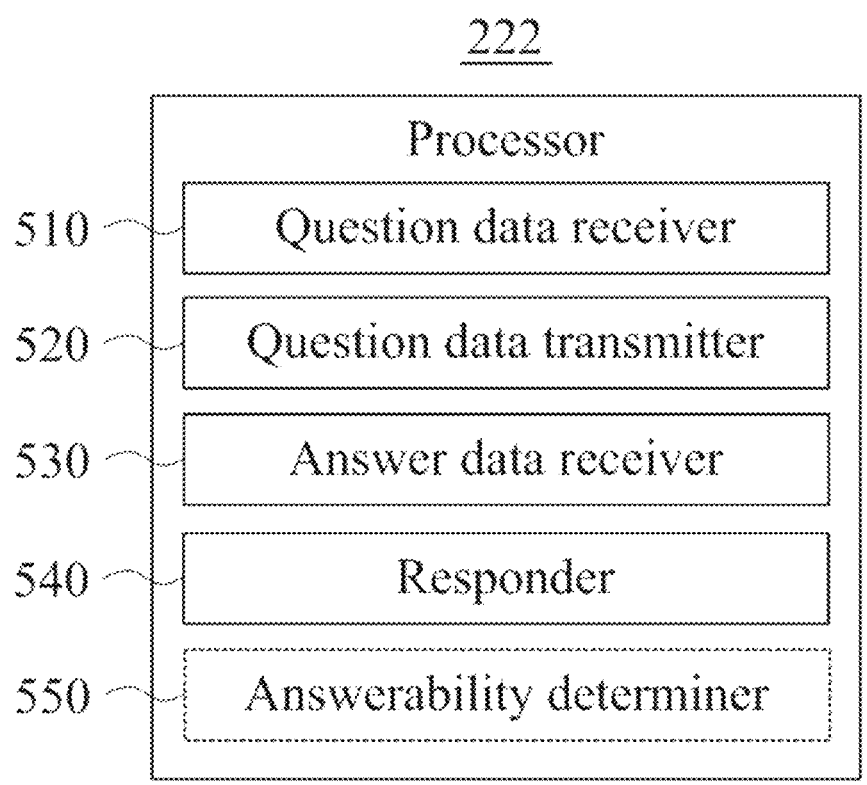
FIG. 5 is a diagram illustrating another example of constituent elements of a processor of a server according to at least one example embodiment.
Figure 6:
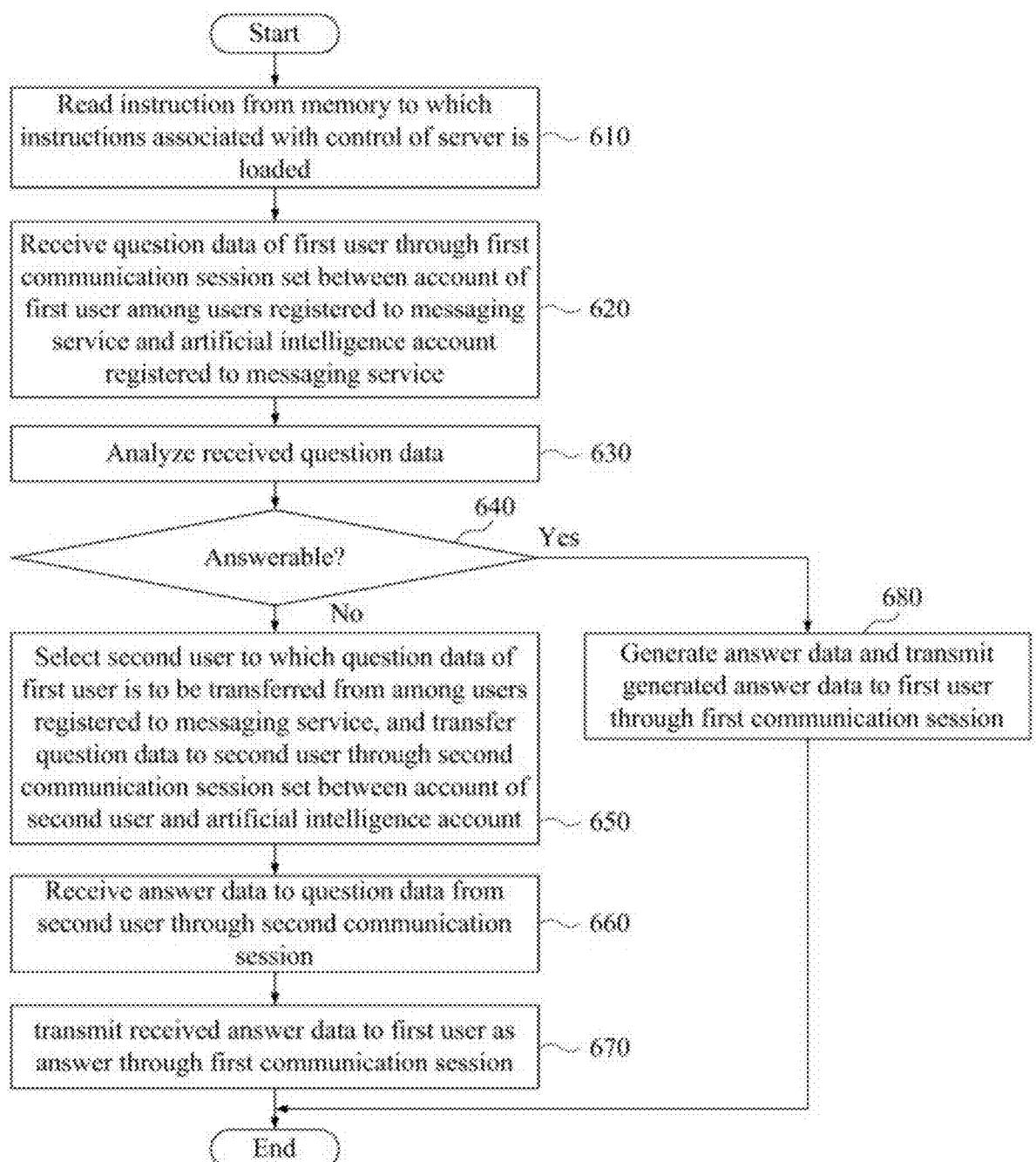
FIG. 6 is a flowchart illustrating another example of a method performed at a server according to at least one example embodiment.

FIG. 5 is a diagram illustrating another example of constituent elements of a processor of a server according to at least one example embodiment, and FIG. 6 is a flowchart illustrating another example of a method performed at a server according to at least one example embodiment.

According to the example embodiment, an answer relay system configured as a computer may be constructed in the server 150. Referring to FIG. 5, to perform an answer relay method of FIG. 6, the processor 222 of the server 150 may include a question data receiver 510, a question data transmitter 520, an answer data receiver 530, and a responder 540. Depending on example embodiments, the processor 222 may further include an answerability determiner 550.

The processor 222 (e.g., the constituent elements of the processor 222) may control the server 150 to perform operations 610 through 680 included in the answer relay method of FIG. 6. For example, the processor 222 (e.g., the constituent elements of the processor 222) may be configured to execute an instruction according to a code of at least one program and/or a code of an OS stored in the memory 221.

Here, the constituent elements of the processor 222 may be representations of various functions performed at the processor 222 in response to an instruction provided from the program code stored in the server 150. For example, the question data receiver 510 may be a functional representation of the processor 222 that controls the server 150 to receive question data in response to the instruction.

In operation 610, the processor 222 may read at least one instruction from the memory 221 to which instructions associated with control of the server 150 have been loaded. In this case, the instruction read from the memory 221 of the processor 222 may include at least one instruction for controlling the processor 222 to perform the following operations 620 through 680.

In operation 620, the question data receiver 510 may receive question data of a first user through a first communication session (e.g., a messenger chatroom) set between an account of the first user among users registered to a messaging service and an AI account registered to the messaging service. For example, if the first user inputs a question A through the messenger chatroom opened between the AI account and the account of the first user, the answer relay system may receive the question A as question data.

The answerability determiner 550 may analyze the received question data in operation 630 and may determine answerability associated with the received question data in operation 640. For example, the answerability determiner 550 may extract, for example, a keyword by analyzing a morpheme of the received question data, search a document on a website or a database associated with the answer relay system using the extracted keyword, and determine the answerability based on the search result. If the received question data is determined to be answerable, operation 680 may be performed. Otherwise, operation 650 may be performed.

If unanswerable, the answer relay system may acquire answer data to the question data through another user registered to the messaging service through operations 650 through 670.

In operation 650, the question data transmitter 520 may select a second user to which the question data of the first user is to be transmitted from among the users registered to the messaging service, and may transmit the question data to the second user through a second communication session set between an account of the second user and the AI account. For example, question data may be transmitted to the second user by displaying the question A of the first user through a messenger chatroom opened between the account of the second user and the AI account. Here, the question data may be transmitted to the second user as if the AI initially speaks to the second user. Examples thereof will be further described. A plurality of users may be selected as the second users. In this case, question data may be transmitted to each of the plurality of second users.

In operation 650, the question data transmitter 520 may select the second user based on a previous history of each of the users registered to the messaging service. Here, a previous history may include at least one of a location of a corresponding user registered to the messaging service, a time at which a question message is transmitted through the messaging service, a time at which answer data to question data is transmitted through the messaging service, or a time at which an answer to the question data is refused.

Also, in operation 650, the question data transmitter 520 may randomly select the second user from among the users registered to the messaging service or may select the second user based on the question data. The question data transmitter 520 may classify the question data based on, for example, a subject or a category of the question data, and may select the second user based on the classification.

Further, the answer relay system may manage a user registered as an answerer among the users registered to the messaging service. In this case, the question data transmitter 520 may select the second user based on profiles of users registered as answerers. Here, the a profile of a user registered as the answerer may be generated based on an instant message transmitted and received through a communication session set between the account of the user registered as the answerer and the AI account.

In operation 660, the answer data receiver 530 may receive answer data to the question data from the second user through the second communication session. For example, content input to the messenger chatroom from the second user after receiving the question A may be received as answer data to question data. In the case that the question data is transmitted from the answer data receiver 530 to the plurality of users in operation 650, the answer data receiver 530 may also receive a plurality of pieces of answer data in operation 660.

In operation 670, the responder 540 may transmit the received answer data to the first user as an answer through the first communication session. Likewise, a plurality of answers may be transmitted to the first user. Accordingly, the first user may acquire answer data to the question data of the first user.

As described above, if the answer relay system is capable of directly providing an answer by analyzing the question data, the answer relay system may immediately provide the answer to the question data to the first user without transmitting the question data to and receiving answer data from the other users.

In operation 680, the responder 540 may generate answer data and may transmit the generated answer data to the first user through the first communication session. That is, if the received question data is determined to be answerable, the responder 540 may directly generate the answer data and may transmit the answer data to the first user. For example, the responder 540 may search a document on a website or a database connected to the relay answer system using a keyword acquired by analyzing the received question data, generate answer data based on a search result, and transmit the generated answer data to the first user.

Hereinafter, various example embodiments associated with relaying an answer and training an AI will be described.

In some example embodiments, a method of matching a user (e.g., a questioner) with another user (e.g., an answerer) who is to provide an answer to the user or with a specialist of a specific field selected from among other users may be performed by selecting another user or a specialist with respect to a specific topic, transmitting a query from the AI (or alternatively, an AI intermediary) to the other user or the specialist, and receiving a response to the query from the other user or the specialist, respectively instead of randomly performed the matching method. The AI intermediary may be configured through an interface function included in an electronic device (e.g., the electronic device 110) of the user to receive a query from the user, or through a query-and-response engine function or a question-and-answer engine function included in a server (e.g., the server 150) to relay a query and a response between the user and the other user or the specialist.

An example of a query-and-response process may be performed by the process flow 1 as 2 as described in the following paragraphs. Transmitting a query to another user or a specialist may correspond to transferring the query to an electronic device (e.g., the electronic device 120) of the other user or the specialist. Transmitting a question or transmitting an answer may be processed using an instant messaging. To this end, an application for the corresponding instant messaging may be installed on the electronic device of the user or the electronic device of the other user or the specialist.

1. User questions→AI (AI) answers to question→if dissatisfied or unanswerable→ask another user or specialist→answer from the other user or specialist→transmit answer content to user (e.g., questioner)→train AI with the question and the answer.

According to this process flow, if the answer relay system (e.g., AI) is capable of directly providing an answer to the question of the questioner, the answer relay system may directly provide the answer. If a response of the questioner to the answer indicates dissatisfaction or if the answer relay system is incapable of directly providing the answer, the answer relay system may acquire an answer to the question from the answerer (e.g., other user or a specialist), and may transmit the answer to the questioner. The AI may be trained through the question and the answer. A method may be repeatedly processed to provide an answer to a question from another questioner.

2. Wider range than the aforementioned process flow 1: machine question (random question associated with a specific field)→user answer→DB According to this process flow, although the AI learning system has not received a separate question from the user, the AI learning system may autonomously acquire learning data by randomly selecting a question by transmitting the question to users, receiving answers to the question from the users, and generating the answers as a database.

According to some example embodiments, the answer relay system or the AI learning system may categorize the users in advance to select another user or a specialist capable of providing an answer appropriate for the question of the user. For example, the answer relay system or the AI learning system may categorize the users based on conversation contents between the users, for example, instant messages transmitted and received through the messenger chatroom, or conversation contents between the users and the AI. For example, each of the users may be categorized in advance based on question contents of a user, answer contents of the user, and/or question contents not answered by the user, and a user may be selected from among the categorized users as another user or a specialist associated with a question of a specific user. All of the queries and responses may be stored in the database and automatically learned by the AI intermediary. The AI intermediary may analyze questions of questioners and may classify as to whether contents are answerable contents by the user, or should be asked to a different user or a specialist through the database.

The other user or the specialist to which the question is to be transmitted may be extracted based on a category suitable for the question. For example, a currently answerable user who has a relatively high response rate or an active history in a corresponding timeline, may be extracted. In some example embodiments, hierarchical information (e.g., an answer history, an answer rate, a field similarity, or user propensity information) may be used. Further, information collected through the answer relay service and other services associated with the answer relay service may be used.

A question-and-answer form may be transmitted using various types of information (e.g., a simple text, a sticker, emoticon, an image (image or wallpaper relating to the question), a video, a voice file, location information, a telephone number, a contact, a map, or a link).

According to some example embodiments, an environment or a user interface for operating a question-and-answer engine may include a messenger. In some example embodiments, the use interface may include an actual robot (e.g., a home robot, toys, or an industrial robot) in addition to the messenger. If the questioner gives a question to a home robot, the home robot may recognize the question of the questioner using a voice recognition function, and transmit the recognized question to the answer relay system through the network 170. An answer provided from the answer relay system may be transmitted to the home robot through the network 170 and may be provided to the questioner through an output device included in the home robot. In this case, the question and the answer may be transmitted and received through a communication session set between an account of the questioner for the home robot and the AI account.

The aforementioned methods may be applied to general sentences aside from the question-and-answer form. In some example embodiments, the constructed questions/responses and/or conversation data may be used as learning data, and/or may be used as questions/answers/conversation data of the AI (e.g., the question-and-answer engine). Here, in existing methods, the AI intermediary may be trained to answer B to a word A in a form of (A→B). According to some example embodiments, the AI intermediary may initially speak to users (e.g., the AI intermediary initially transmits a question to the users), automatically recognize a question/response in a form of (A→B) with respect to a response to the transmitted question, may use the recognized question/response as learning data.

Because the users may not provide appropriate answers to a question at all times, the answer relay system or the AI learning system may include a function of filtering out noise from the received answers.

FIGS. 7 through 10 illustrate examples of a conversation flow for relaying an answer according to at least one example embodiment.

Figure 7:
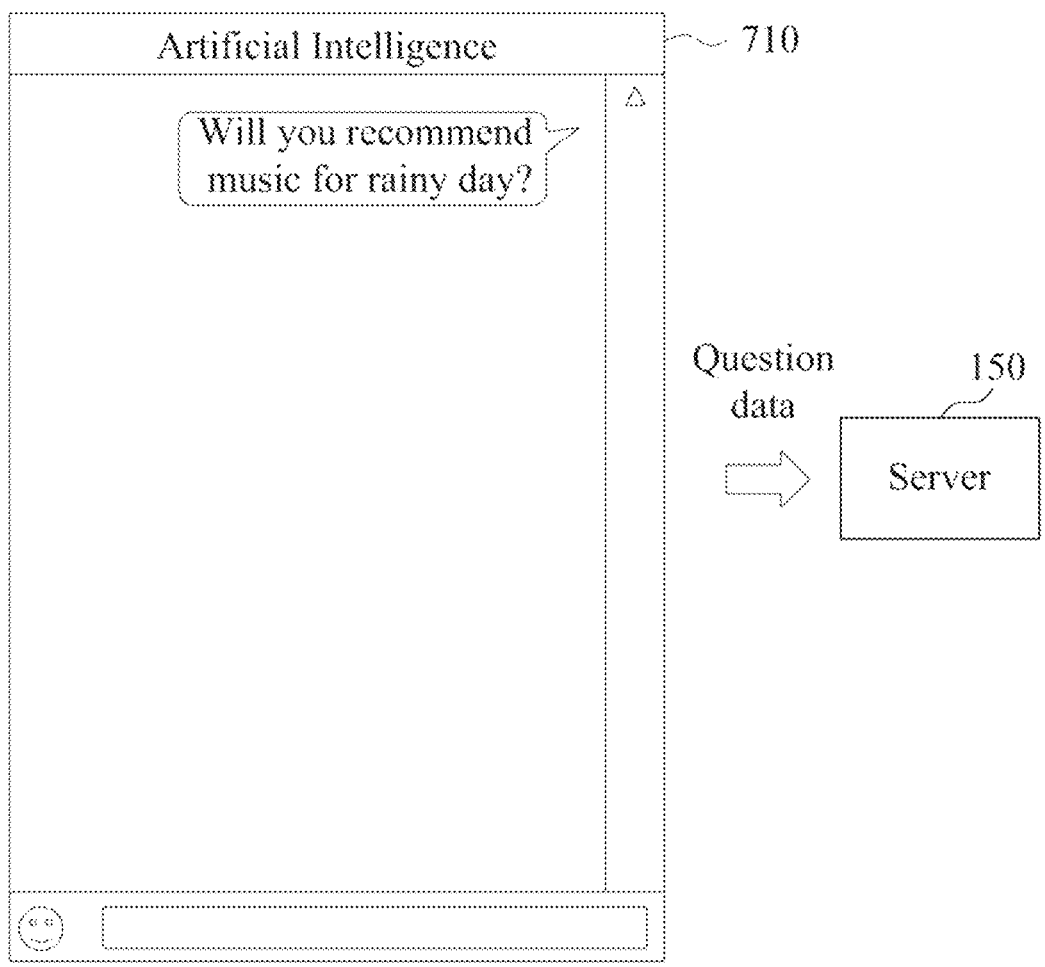
FIGS. 7 through 10 illustrate examples of a conversation flow for relaying an answer according to some example embodiments.

FIG. 7 illustrates an example in which a question "Will you recommend music for rainy day?" is input through a messenger chatroom 710 corresponding to a communication session 'b' (not shown) set between an account of a questioner 'a' (not shown) and an account of an AI. Here, the messenger chatroom 710 may be an example of a screen displayed on an electronic device of the questioner 'a.' The question input through the messenger chatroom 710 may be transmitted to the server 150 through a communication session b as question data. The server 150 may acquire the question data.

Figure 8:
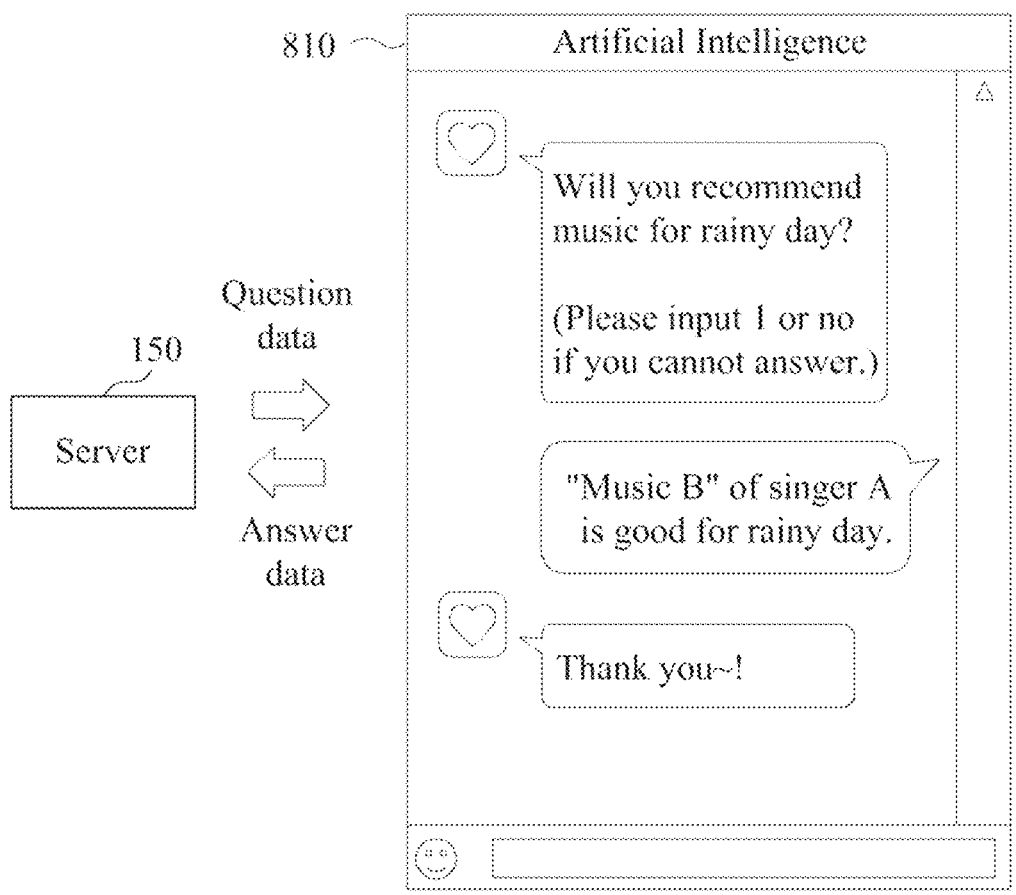

FIG. 8 illustrates an example in which a question "Will you recommend music for rainy day?" is input through a messenger chatroom 810 corresponding to a communication session 'd' (not shown) set between an account of an answerer 'c' having selected question data and the account of the AI. Here, if the question data is difficult for the answerer 'c' (not shown) to give an answer, a correspondence method for inducing a reaction of the answerer 'c', such as "Please input 1 or no if you cannot answer" may be transmitted to the answerer 'c' together with the question data. If the answerer 'c' inputs ""Music B" of singer A is good for rainy day" as the answer, the input answer may be transmitted to the server 150 through the communication session 'd' as answer data. The server 150 may acquire the answer to the question of the questioner 'a.' Here, providing of a response, such as "Thank you~!", may be processed at the server 150 through the AI, as a positive response to acquiring the answer. An answerer may be selected using a variety of methods.

Figure 9:
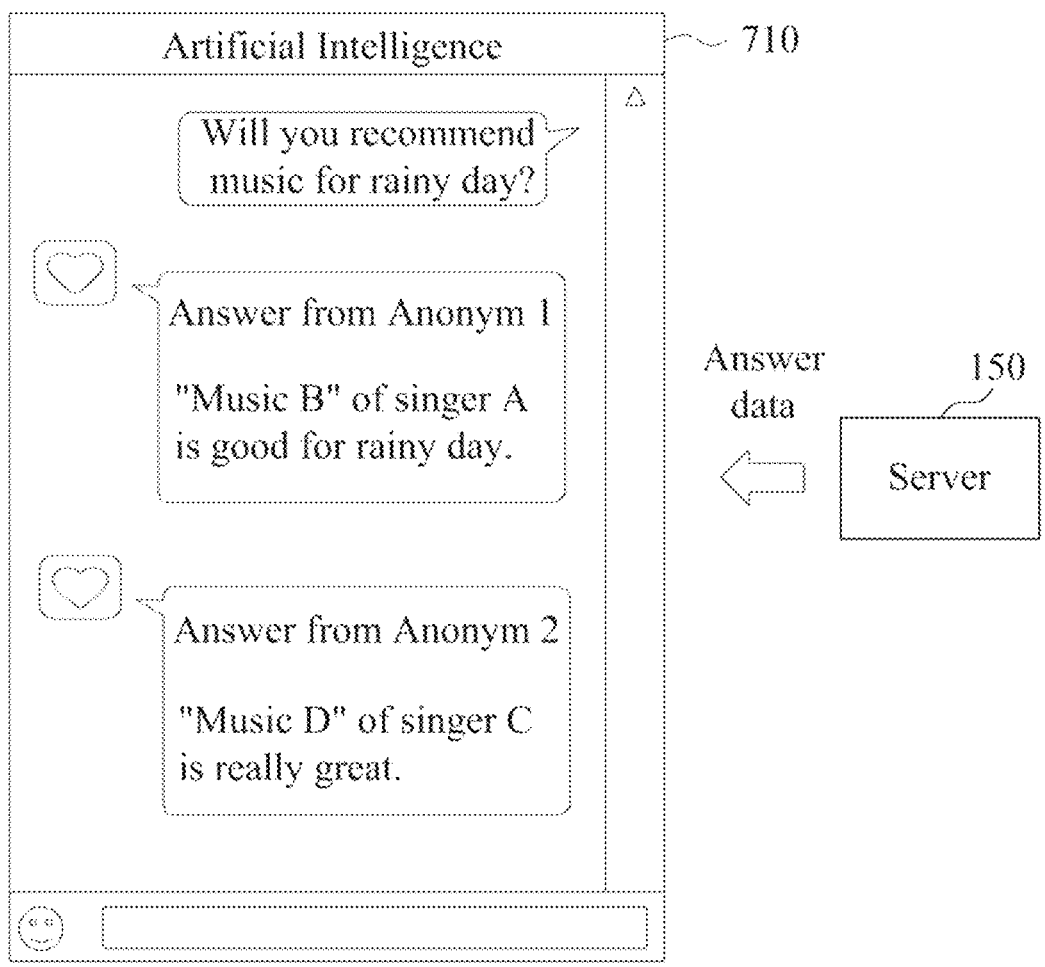

FIG. 9 illustrates an example in which the server 150 transmits the acquired answer to the questioner a through the communication session 'b.' Accordingly, the answer to the question may be displayed on the messenger chatroom 710. Here, the answer of the answerer 'c' may be anonymously transmitted to the questioner 'a.' Also, if question data is transmitted to a plurality of answerers, a plurality of pieces of answer data may be received. In this case, the server 150 may sequentially transmit the received answer data to the questioner 'a.' The messenger chatroom 710 shows an example in which the plurality of pieces of answer data are If the questioner a gives another question, transmitting of another piece of answer to a previous question may be suspended.

Figure 10:
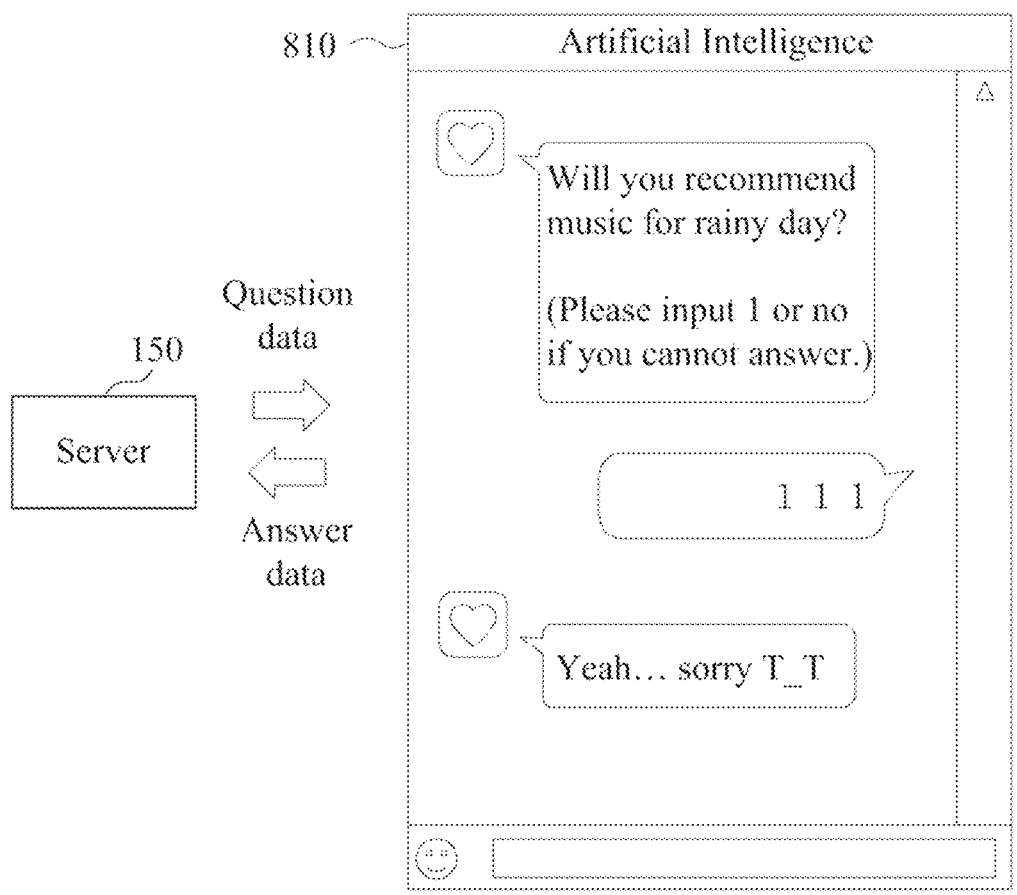

FIG. 10 illustrates an example in which the question is difficult for the answerer 'c' to answer. If the answerer 'c' indicates that he or she is not able to answer the question by, for example, inputting '111' through the messenger chatroom 810, the AI may provide an appropriate answer to the answerer 'c.'

Question data may not be in a form of a question at all times. Any type of instant messages transmitted from users to the AI may be used as the question data. For example, although "hungry" is not in the question form, it may be used as question data. A response to the question data "hungry" may be received from the answerer as answer data and may be used.

Figure 11:
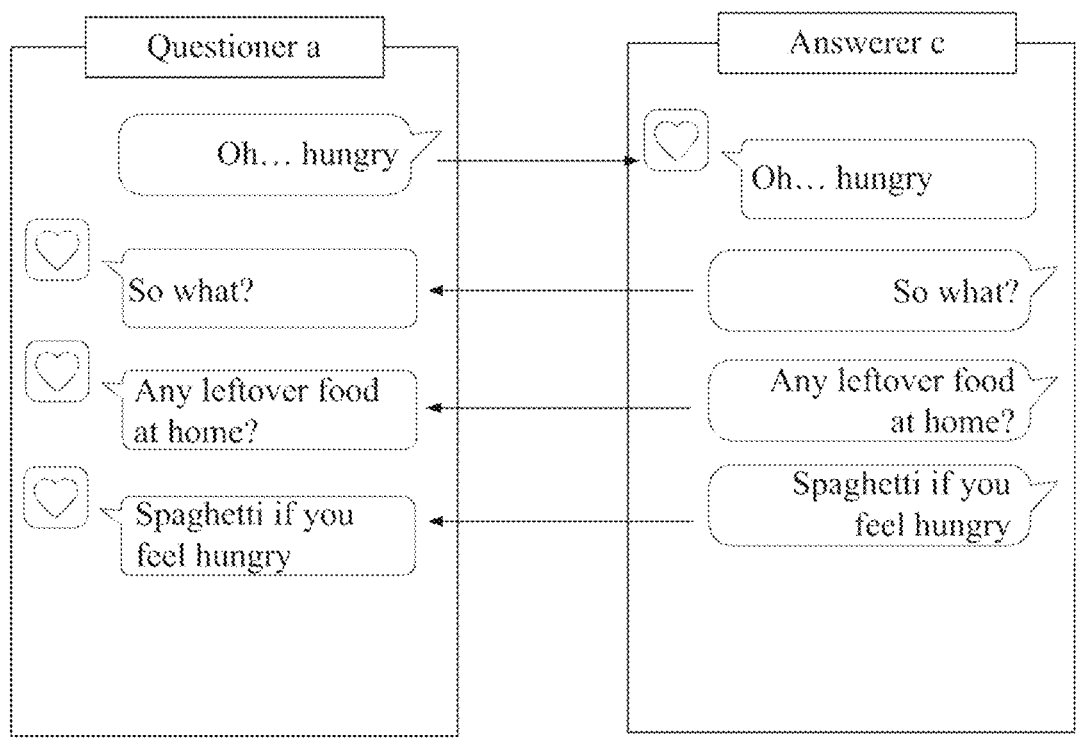
FIG. 11 illustrates an example of a process of relaying an answer to question data not in a form of a question according to at least one example embodiment.

FIG. 11 illustrates an example of a process of relaying an answer to question data that is not in a question form. The answer relay system may provide an answer by transmitted question data "Oh . . . hungry" of the questioner 'a' to the answerer 'c,' and by relaying the answer of the answerer 'c' to the questioner 'a.' The AI may be trained through question data and answer data, and may directly provide an answer to the same or a substantially similar question. If an answer is not received from the answerer 'c' during a desired (or alternatively, predetermined) period of time, transmitting an answer of the answerer 'c' may be automatically skipped.

The answer relay system may transmit question data of the questioner 'a' to a plurality of answerers, and transmit to the questioner 'a' all of or a portion of a plurality of pieces of answer data received from the plurality of answerers in association with the question data.

Figure 12:
FIG. 12 illustrates an example of a conversation flow for initial registration according to at least one example embodiment.

FIG. 12 illustrates an example of a conversation flow for initial registration according to at least one example embodiment. Referring to FIG. 12, a messenger chatroom 1210 shows an example of a process in which "Sally" set as a name of an AI character requests a user to set a nickname and transmits question data based on the set nickname. Answer data to question data may be used to train an AI and give an answer to a question of a questioner.

Figure 13:
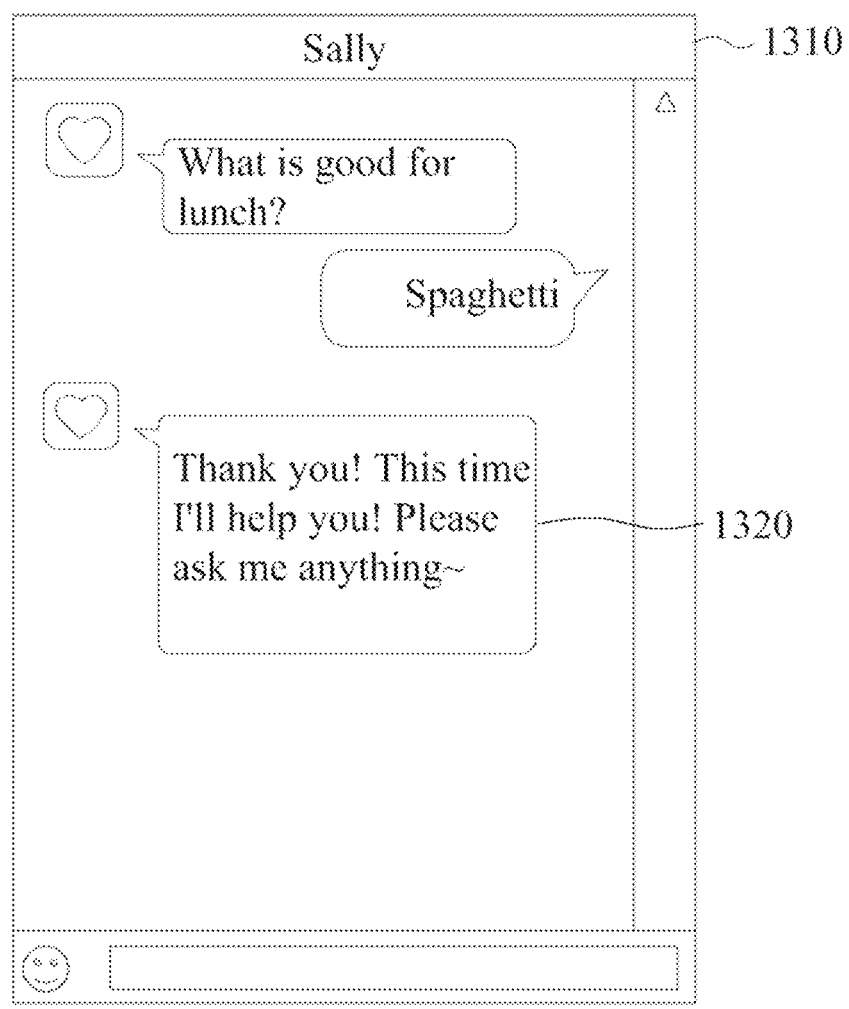
FIG. 13 illustrates an example of deriving a question according to at least one example embodiment.

FIG. 13 illustrates an example of deriving a question according to at least one example embodiment. Referring to FIG. 13, a messenger chatroom 1310 shows an example of providing a user with an instant message 1320 for deriving a question of the user.

Figure 14:
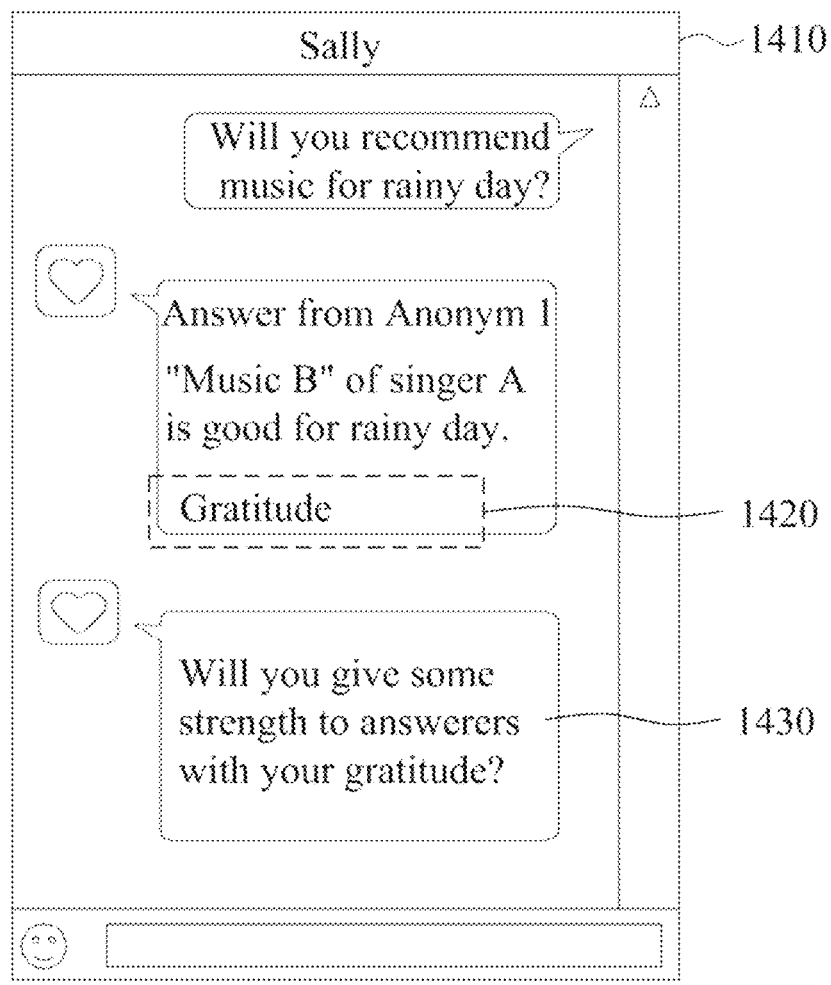
FIG. 14 illustrates an example of evaluating an answer and expressing a gratitude according to at least one example embodiment.

FIG. 14 illustrates an example of evaluating an answer and expressing a gratitude according to at least one example embodiment. Referring to FIG. 14, a messenger chatroom 1410 shows a user interface 1420 for providing a gratitude message with respect to an answer of an answerer (e.g., anonym 1) to the answerer. In response to a selection of the user on the user interface (e.g., in response to a user touch on an area on which the user interface 1420 is displayed with a finger in a touch screen environment), the gratitude message may be transmitted to the answerer. Here, a number of times the gratitude message (e.g., like) is received may be recorded for each user and may be managed as activity details of the users.

In some example embodiments, the users may transmit a gratitude message by providing a text 1430 to the answerer who have sent the answer.

The answerers may act with their nicknames.

Figure 15:
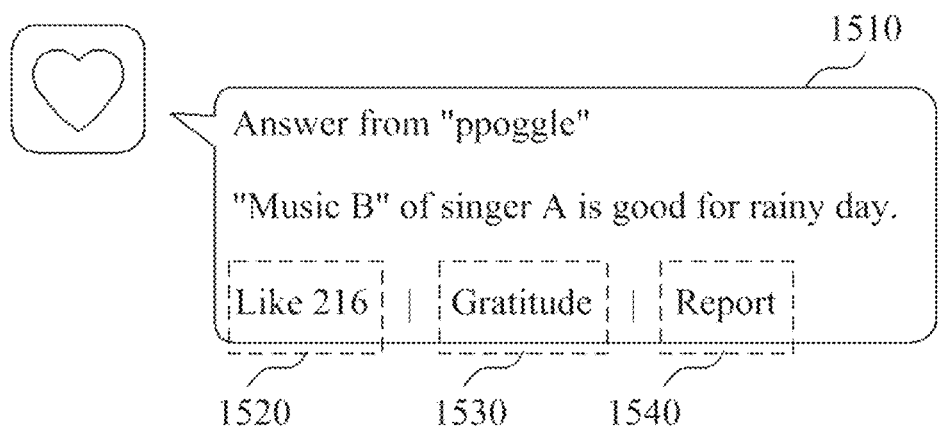
FIG. 15 illustrates an example of an answer message according to at least one example embodiment.

FIG. 15 illustrates an example of an answer message according to at least one example embodiment. Referring to FIG. 15, an answer message 1510 shows an example of an instant message that may be transmitted to a questioner as an answer. Here, an answerer may be indicated in the answer message 1510 using a nickname (ppoggle) of the answerer. In this case, in the answer message 1510, the number of gratitude messages received at the answerer with the nickname "ppoggle" is indicated with counts 1520 of "like." A user interface 1530 for transmitting a gratitude message to the answerer with the nickname "ppoggle" may be added to the answer message 1510. A report interface 1540 for reporting the answerer with the nickname "ppoggle" may be further included in the answer message 1510.

According to some example embodiments, each of answer messages may include a link to a detailed answer page. Here, the detailed answer page may provide the counts 1520 of "like", the user interface 1530, or the report interface 1540.

In some example embodiments, a messenger chatroom interface displayed for the users may provide a link to a setting page for displaying activity details of users.

Figure 16:
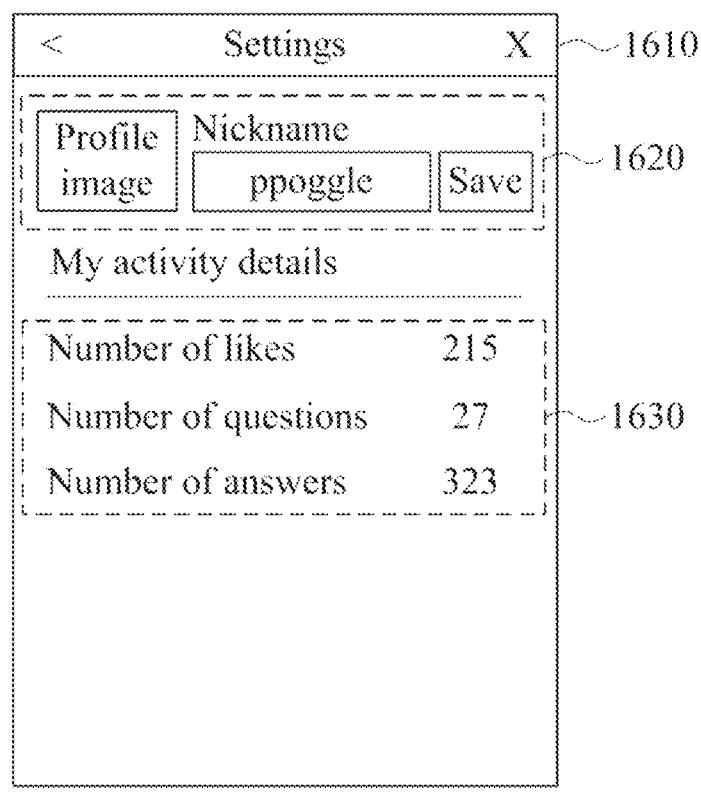
FIG. 16 illustrates an example of a setting page according to at least one example embodiment.

FIG. 16 illustrates an example of a setting page according to at least one example embodiment. FIG. 16 shows an example of a setting page 1610. For example, the setting page 1610 may be connected using a link provided through a messenger chatroom set with an AI account. A first box 1620 indicated with dotted lines represents an interface for correcting a profile image and a nickname of a user. A second box 1630 indicated with dotted lines represents an area for displaying a summary of activity details of the user. Here, "counts of like" may denote the number of gratitude messages received for a user answer. The number of gratitude messages may be used to calculate digital compensation (e.g., cyber money). For example, the answer relay system may provide a service in which if answerers transmit quality answers, and accordingly receive a number of gratitude messages, the answerers is compensated by various types of compensations (e.g., cyber money) based on the number of gratitude messages.

In some example embodiments, answerers may directly request the AI for question data. For example, if the number of answerers is insufficient compared to the number of questioners, some questions may need to wait for answers to be provided. In this case, a specific user may directly fetch a question to which an answer is not tagged yet through a get-a-question function. For example, a user that desires to continuously give an answer may fetch question data to which an answer is not tagged yet through the get-a-question function.

Figure 17:
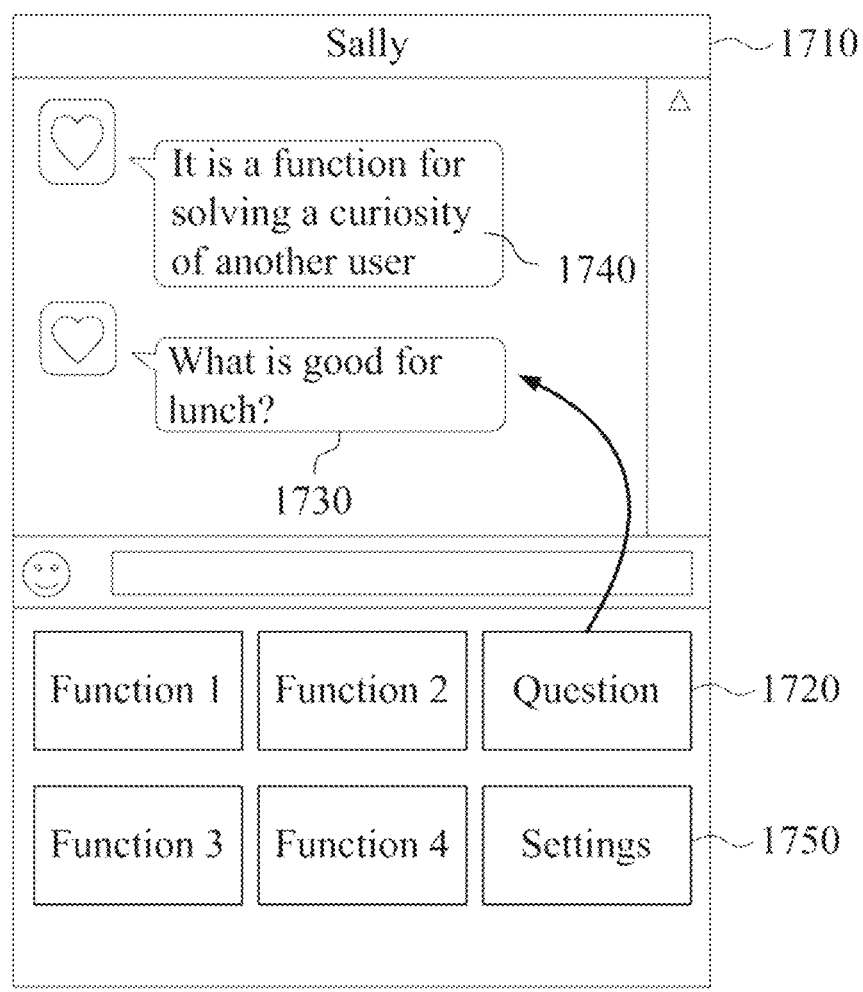
FIG. 17 illustrates an example of a get-a-question function according to at least one example embodiment.

FIG. 17 illustrates an example of a get-a-question function according to at least one example embodiment. A messenger chatroom 1710 with an AI may provide a variety of functions to a user. A get-a-question function 1720 may be a function that enables a user desiring to receive a question or a user desiring to give an answer to fetch a question. For example, in response to a selection of the user using the get-a-question function 1720 (e.g., a user touch on an area on which the get-a-question function 1720 is displayed in a touch screen environment) a corresponding request may be transmitted to the server 150 and the server 150 may transmit, to the user, question data to which an answer is not tagged yet. An instant message 1730 shows an example in which the server 150 provides a question to the user in response to the request transmitted from the user to the server 150 through the get-a-question function 1720. If the user inputs an answer to the provided question, the answer input to the messenger chatroom 1710 may be transmitted to the server 150 as answer data to the provided question. An instant message 1740 may be provided from the AI as a message that includes a description about the get-a-question function 1720 selected by the user. A setting function 1750 may be an example of a user interface that includes a link to a setting page described with FIG. 16.

Information directly capable of being provided from the AI may be managed using various categories. For example, at an early stage, a plurality of classes may be managed as follows:

1. Weather: rainfall, hot/cold, etc.
2. Broadcasting: broadcasting time, casting information, etc.
3. Movie: ratings, casting information, etc.
4. Character: character database information (real name, education, birth, etc.)
5. Book: detailed book information, etc.
6. Encyclopedia of knowledge: subject explanation, etc.
7. Local information: place ratings, road name/address, post code, etc.
8. Music: singer information, title song, representative song, debut album, etc.
9. Finance: market price, index, foreign exchange, etc.
10. Lotto: refer to winning lottery numbers, etc.
11. Image: image search result link, etc.
12. Video: video search result link, etc.
13. Sports: player information, game result, etc.
14. Language dictionary: meaning of a word, etc.
15. Translation: short text translation result, etc.

Also, in addition to information according to the classes, a variety of answers learned according to A learning may be provided. For example, in response to an input of a portion of lyrics of a song, a remaining part of the lyrics may be provided as an answer.

Hereinafter, examples of verifying answerable fields of users will be described.

Figure 18:
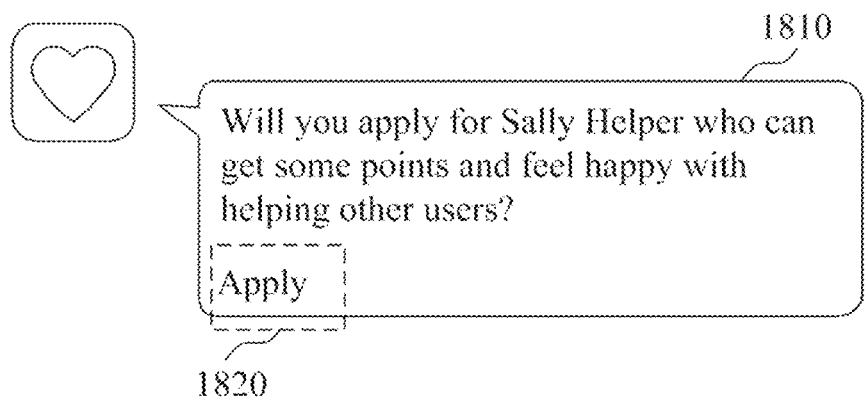
FIG. 18 illustrates an example of recruiting an answerer to verify an answerable field of users according to at least one example embodiment.

FIG. 18 illustrates an example of recruiting an answerer to verify an answerable field of users according to at least one example embodiment. Referring to FIG. 18, an instant message 1810 is an example of a message used for an AI to request users to register as an answerer. The instant message 1810 may be provided to arbitrarily designated users, or may be provided in the middle of conversations between the AI and the users.

Figure 19:
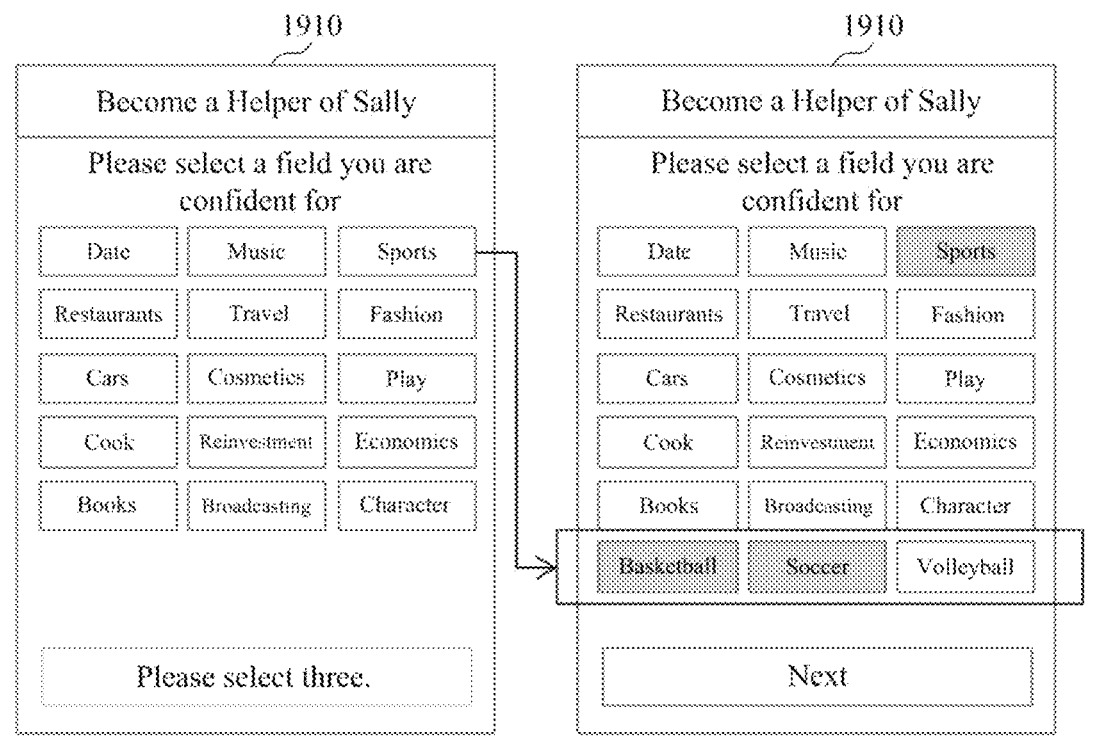

FIG. 19 illustrates an example of verifying an answerable field of an answerer according to at least one example embodiment. For example, the server 150 may classify fields of an answer into various categories, and enable users desiring to register as an answerer with a user interface 1910 to select a category (e.g., date, music or sports). For example, a terminal (e.g., the electronic device 110) of a user may receive information for configuring the user interface 1910 through communication with the server 150, and display the received information on a screen of the terminal of the user under control of an application installed on the terminal of the user. Each of the users may select a desired field using the user interface 1910, and information about the selected field may be transmitted from the terminal of the user to the server 150. Accordingly, the server 150 may verify an answerable field of the user using information about the field selected by the user.

Here, categories may be classified into an upper category and a lower category. FIG. 19 illustrates an example of further displaying lower categories "basketball", "soccer", and "volleyball" in response to a selection on upper category "sports" through the user interface 1910. Further, the lower category may further include an even lower category. For example, in response to a selection on the even lower category "basketball", lower categories of the lower category "basketball" may be further displayed for the user.

In some example embodiments, instead of using an explicit input of an answerable field, the AI may ask a question to users and may verify answerable fields of the users from answers from the users to the question.

Figure 20:
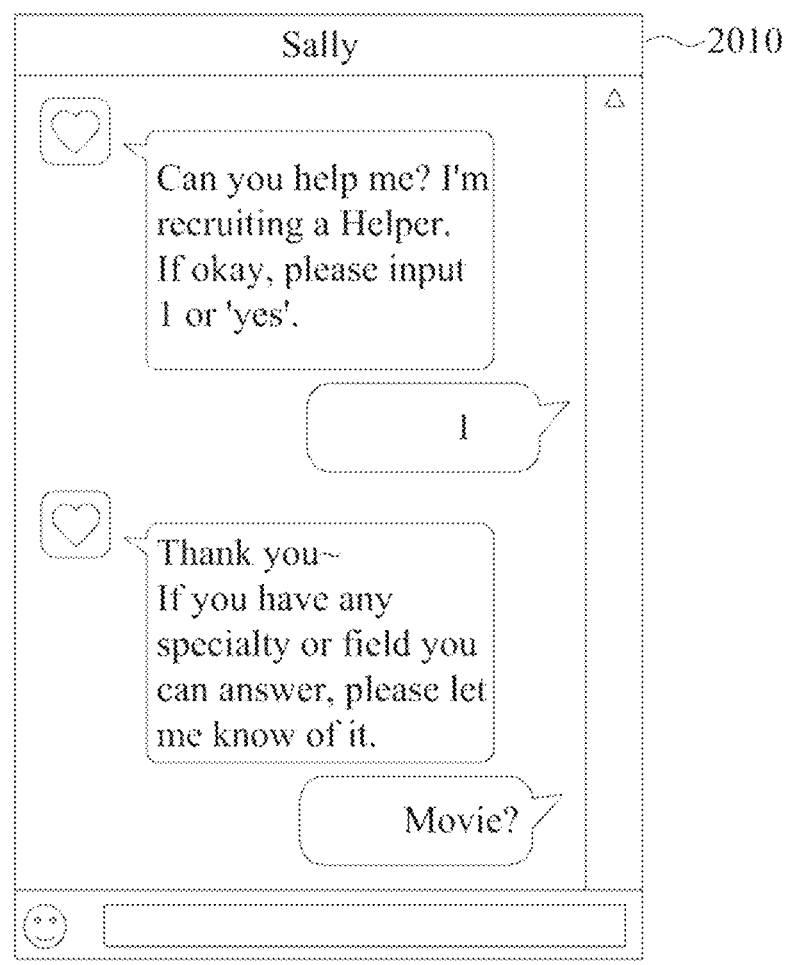
FIG. 20 illustrates an example of verifying an answerable field of a user through a question according to at least one example embodiment.

FIG. 20 illustrates an example of verifying an answerable field of a user through a question according to at least one example embodiment. Referring to FIG. 20, a messenger chatroom 2010 shows an example of a process of inducing a user to give a response to an answerable field in a conversation form so that the AI may verify the answerable field. For example, to derive a response to an answerable field, the AI may proceed with a conversation through a desired (or alternatively, preset) conversation framework, and may verify answerable fields of users while responding to responses of the users further flexibly based on the learning data collected through learning of the AI.

As another example, the AI may verify answerable fields of users using a game method (e.g., a psychological test or a mind reading game). That is, the AI may provide a desired (or alternatively, preset) game capable of verifying the answerable fields of the users to the users, and may verify the answerable fields based on answers received from the users.

In some example embodiments, an operation of the AI may be processed through a communication process between the server 150 and terminals of the users. For example, the server 150 may suggest a game to the users by transmitting an instant message for suggesting the game through the communication session under control of an AI program or an AI engine.

In some example embodiments, the AI may relay a one-to-one conversation between a questioner and a specific answerer.

Figure 21:
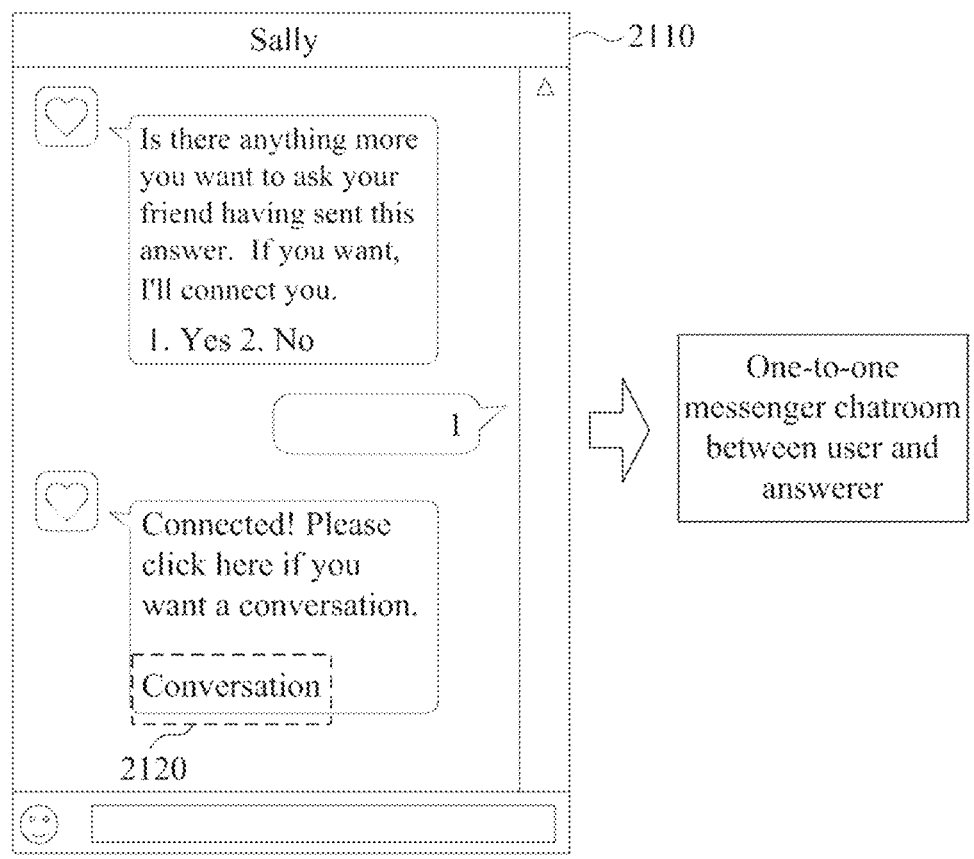
FIG. 21 illustrates an example of a one-to-one conversation relay process according to at least one example embodiment.

FIG. 21 illustrates an example of a one-to-one conversation relay process according to at least one example embodiment. Referring to FIG. 21, a messenger chatroom 2110 shows an example of providing an interface 2120 for providing a one-to-one conversation together with a text for indicating that a one-to-one conversation is relayed between a questioner and an answerer having provided answer data. In response to a user selection on the user interface 2120, a messenger chatroom may be generated between an account of the answerer having provided answer data to the user and an account of the user. In this case, the user may make a direct conversation with the answerer through the generated messenger chatroom. If necessary, a process for asking the answerer for a permission may be added.

In some example embodiments, a specific specialist may be relayed based on a question field or a keyword unit extracted from a question.

Figure 22:
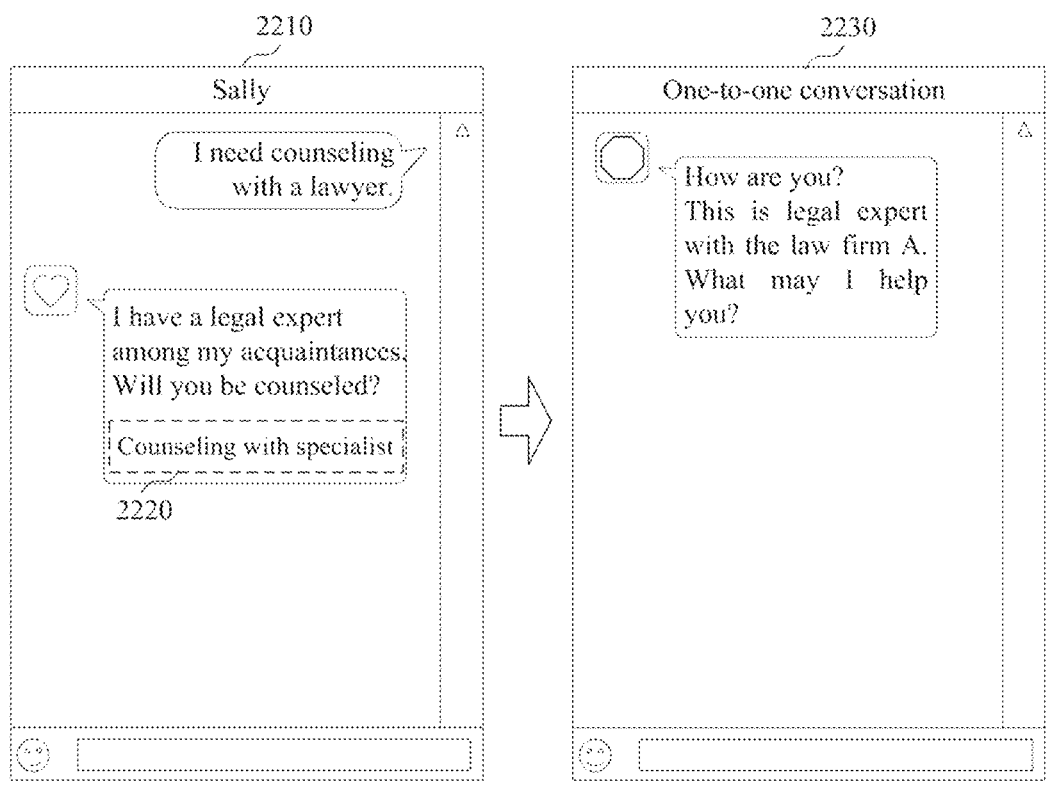
FIG. 22 illustrates an example of a specialist relay process according to at least one example embodiment.

FIG. 22 illustrates an example of a specialist relay process according to at least one example embodiment. Referring to FIG. 22, a first messenger chatroom 2210 shows an example of providing a user interface 2220 for analyzing question data of a user and connecting a specialist to the user. For example, an AI may maintain accounts of specialists for each field and may recommend the user to have a conversation with a specialist of a corresponding field. In response to a user selection on the user interface 2220, the AI (e.g., the server 150 or a messenger server having received the request of the server 150) may generate a communication session between an account of the user and an account of a specialist of a corresponding field. A second messenger chatroom 2230 may be a chatroom according to the generated communication session. The user may proceed with a one-to-one conversation with the specialist of the corresponding field using the second messenger chatroom 2230. Once the second messenger chatroom 2230 is generated, the AI may initially transmit, to the specialist, an instant message indicating that the specialist is connected to a specific user.

Figure 23:
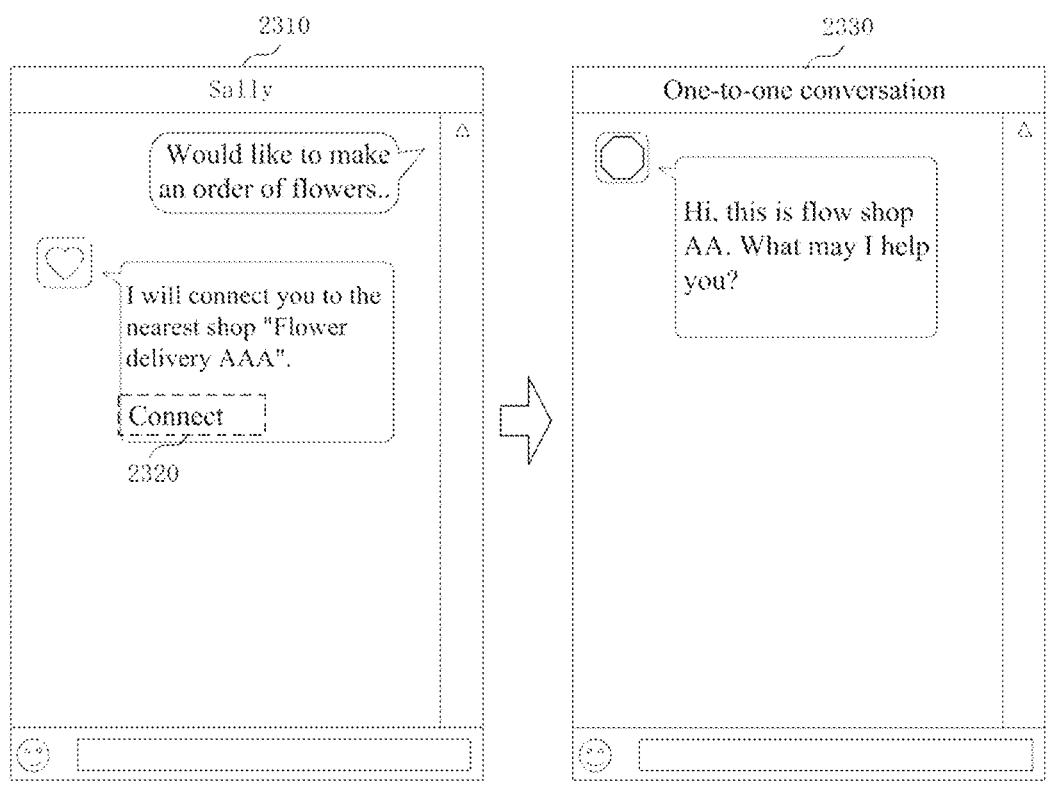
FIG. 23 illustrates another example of a specialist relay process according to at least one example embodiment.

FIG. 23 illustrates another example of a specialist relay process according to at least one example embodiment. Referring to FIG. 23, a first messenger chatroom 2310 shows an example of analyzing question data of a user and providing a user interface 2320 for connecting the user to an appropriate answerer. As described above, an AI may maintain accounts of specialists for each field and may recommend the user to have a conversation with a specialist of a corresponding field. In response to a user selection on the user interface 2320, the AI may generate a communication session between an account of the user and an account of the selected specialist. A second messenger chatroom 2330 may be a chatroom according to the generated communication session, and the user may proceed with a one-to-one conversation with the specialist of the corresponding field using the second messenger chatroom 2330.

As described above, instant messages transmitted and received may be provided in various types, for example, a simple text, an image, a video, a hypertext link, a map, or combinations thereof. A speech tone and/or an aggressive conversation attempt of an AI character may vary based on results of an AI learning. Also, the AI may be configured to recommend users various contents (e.g., news, music, or a psychological test), instead of a simple question.

Also, if a size of question data or answer data is greater than or equal to a desired (or alternatively, predetermined) size, a detailed view function of the question data or the answer data may be provided through a separate detailed page or a separate web application, instead of using a messenger chatroom. For example, through the messenger chatroom, a user interface for connection to the separate detailed page or a user interface for executing the separate web application and viewing the full content may be included in a messenger chatroom together with a portion of the full content.

Further, questions and answers present in another service may be used through interconnection with the services for questions and answers. For example, the AI may search for a question A from another service and use an answer to the question A. Further, a user interface capable of immediately connecting to the answer of the other service may be provided to a questioner.

According to example embodiments, a point may be provided for a question and an answer. For example, a questioner may provide a portion of points of the questioner to answerers who have provided answers to a question of the questioner. In a case where the questioner does not have points or is not configured to issue points, basic points may be provided to the answerers. For example, the number of gratitude messages received may be converted into points. Points may be cyber money consumable for a game, a lottery, an event, etc.

Points offered by a questioner may be used to determine the number of answerers to which question data is to be transmitted. For example, the AI may be configured to transmit question data to a relatively large number of answerers according to an increase in points offered by the questioner. If a plurality of pieces of answer data are present with respect to a single piece of question data, points may be assigned to an early-answering answerer or an answerer selected by the questioner.

According to some example embodiments, it is possible to transmit question data to users using a messaging service in an instant messaging environment and to train an AI using answers of the users to the question data. Further, according to some example embodiments, an AI may directly provide an answer to a question using an instant message of a user in an instant messaging environment, and may also relay an answer using an instant message of each of other users or a user selected as a specialist of a specific field from among the other users by connecting the users to each other.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Example embodiments may be recorded in non-transitory computer-readable media including program instructions to implement various operations embodied by a computer. The media may also include, alone or in combination with the program instructions, data files, data structures, and the like.

The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited thereon, Such elements or features are interchangeable and can be used in different example embodiments, although not specifically shown or described. The disclosed example embodiments may be varied in many ways. Such variations are not to be regarded as a departure from the disclosure, and all such modifications are intended to be included within the scope of the disclosure.

What is claimed is:

1. An artificial intelligence (AI) learning method of an AI learning system implemented on a computer, the method comprising:
    selecting, by a processor of a server that includes or is connected to the AI learning system, question data from a database associated with the server;
    verifying, by the processor, a communication session between an account of at least one user among users registered to a messaging service and an AI account, the AI account associated with an AI engine of the AI learning system and registered to the messaging service;
    causing, by the processor, the AI account to transmit questions to the at least one user;
    receiving, by the processor, from the account of the at least one user answers to the questions through the verified communication session;
    generating, by the processor, a profile of the at least one user based on the questions from the AI account and the answers from the account of the at least one user;
    designating, by the processor, one of the at least one user as an answerer based on the profile of the at least one user;
    transmitting, by the processor, the question data to the answerer through the verified communication session as an instant message of the AI account;
    receiving, by the processor, answer data to the question data from the answerer through the verified communication session;
    generating, by the processor, learning data by mutually associating and storing the question data and the received answer data, to train the AI engine based on the question data and the received answer data;
    receiving question data of a first user through a first communication session, the first communication session between an account of the first user among users registered to a messaging service and an AI account;
    selecting a second user to which the question data of the first user is to be transmitted from among the users registered to the messaging service;
    transmitting the question data to the second user through a second communication session between an account of the second user and the AI account;
    receiving answer data to the question data of the first user from the second user through the second communication session; and
    transmitting the received answer data from the second user to the first user as an answer for the question data of the first user through the first communication session, to train the AI engine based on the received answer data and the question data.

2. The method of claim 1, wherein
    the server is a messaging server, in which the AI learning system is included, or to which the AI learning system is connected over a network,
    the messaging server is configured to provide the messaging service, and
    the verifying comprises,
        identifying the at least one user among the users registered to the messaging service, and
        setting the communication session between the account of the at least one user and the AI account through the messaging server.

3. The method of claim 1, wherein
    the selecting question data includes selecting or generating the question data using the database, which is included in the AI learning system, or is connected to the AI learning system over a network, and
    the database is generated based on at least one of instant messages transmitted and received between the users registered to the messaging service, instant messages transmitted and received between the users registered to the messaging service and the AI account, or previously generated learning data.

4. The method of claim 1, wherein the selecting question data comprises generating the question data using an instant message received through a first communication session between an account of a first user among the users registered to the messaging service and the AI account.

5. The method of claim 4, further comprising:
    transmitting the received answer data through the first communication session for the account of the first user.

6. The method of claim 5, wherein the generating the learning data comprises generating the learning data by further using response data, the response data being data received from the first user in response to the received answer data transmitted through the communication session between the account of the first user and the AI account.

7. The method of claim 1, wherein
    the selecting question data comprises selecting the question data based on a question message received through a first communication session between an account of a first user among the users registered to the messaging service and the AI account,
    the verifying comprises selecting the at least one user based on a previous history of each of the users registered to the messaging service, and
    the previous history includes at least one of
        a location of a corresponding user registered to the messaging service,
        a time at which the question message is transmitted through the messaging service,
        a time at which the answer data to the question data is transmitted through the messaging service, and a time at which an answer to the question data is refused.

8. The method of claim 1, wherein the at least one user is randomly selected from among the users registered to the messaging service or selected from among the users based on the question data.

9. The method of claim 1, further comprising:
analyzing the received question data of the first user and determining whether the trained AI engine is capable of providing an answer for the question data of the first user; and
in response to a result of the analyzing indicating that the trained AI engine is not capable of providing an answer for the question data of the first user, performing the selecting, the transmitting the question data to the second user, and the receiving answer data from the second user.

10. The method of claim 9, wherein the analyzing comprises:
searching a database connected to the answer relay system or a document on a website using a keyword acquired by analyzing the question data; and
determining whether the second user is capable of providing the answer based on a result of the searching.

11. The method of claim 9, wherein in response to the result of the analyzing indicating that the second user is not capable of providing the answer to the question data, the transmitting the question data to the second user includes transmitting the question data to a third user through a third communication session, the third communication session between an account of the third user and the AI account.

12. The method of claim 1, wherein
the transmitting the question data to the second user includes transmitting the question data by selecting the second user based on a previous history of each of the users registered to the messaging service, and
the previous history includes at least one of
a location of a corresponding user registered to the messaging service,
a time at which a question message including the question data is transmitted through the messaging service,
a time at which the answer data to the question data is transmitted through the messaging service, and
a time at which an answer to the question data is refused.

13. The method of claim 1, wherein the transmitting the question data to the second user includes transmitting the question data to the second user randomly selected from among the users registered to the messaging service or selected based on the question data.

14. An artificial intelligence (AI) learning system implemented on a computer, the system comprising:
a memory configured to store non-transitory computer-readable instructions; and
at least one processor configured to execute the non-transitory computer-readable instructions such that the at least one processor causes the system to,
select question data from a database associated with a server that includes or is connected to the AI learning system,
verify a communication session set between an account of at least one user among users registered to a messaging service and an AI account, the AI account associated with an AI engine of the AI learning system and registered to the messaging service,
cause the AI account to transmit questions to the at least one user,
receive from the account of the at least one user answers to the questions through the verified communication session,
generate a profile of the at least one user based on the questions from the AI account and the answers from the account of the at least one user,
designate one of the at least one user as an answerer based on the profile of the at least one user,
transmit the question data to the answerer through the verified communication session as an instant message of the AI account,
receive answer data to the question data from the answerer through the verified communication session,
generate learning data by mutually associating and storing the question data and the received answer data, for training the AI engine based on the question data and the received answer data,
receive question data of a first user through a first communication session, the first communication session between an account of the first user among users registered to a messaging service and an AI account,
select a second user to which the question data of the first user is to be transmitted from among the users registered to the messaging service,
transmit the question data to the second user through a second communication session between an account of the second user and the AI account,
receive answer data to the question data of the first user from the second user through the second communication session, and
transmit the received answer data from the second user to the first user as an answer for the question data of the first user through the first communication session, to train the AI engine based on the received answer data and the question data.

15. The system of claim 14, wherein
the server is a messaging server, in which the AI learning system is included, or to which the AI learning system is connected over a network,
the messaging server is configured to provide the messaging service, and
the at least one processor is configured to verify the communication session by
identifying the at least one user among the users registered to the messaging service, and
setting a new communication session between the account of the at least one user and the AI account through the messaging server.

16. The method of claim 1, further comprising:
storing, by the AI learning system, the learning data in a learning database included in or is in communication with the server over a network; and
acquiring, by the AI learning system, answer data having improved accuracy to the question data from the learning database through a process of continuously filtering the answer data suitable for the question data, to train the AI engine.

17. The method of claim 1, further comprising:
storing, by the AI learning system, the learning data in a learning database included in or is in communication with the server over a network; and
acquiring, by the AI learning system, answer data having improved accuracy to the question data from the learning database through a process of continuously filtering the acquired answer data suitable for the question data, to train the AI engine.

18. The system of claim 14, wherein the at least one processor is further configured to execute the non-transitory computer-readable instructions such that the at least one processor causes the system to
- store the learning data in a learning database included in or is in communication with the server over a network; and
- acquire answer data having improved accuracy to the question data from the learning database through a process of continuously filtering the answer data suitable for the question data, to train the AI engine.

\* \* \* \* \*